(12) United States Patent
Liu et al.

(10) Patent No.: US 10,873,451 B2
(45) Date of Patent: Dec. 22, 2020

(54) CONTENT DELIVERY NETWORK PROCESSING METHOD, CONTENT DELIVERY NETWORK, DEVICE, AND STORAGE MEDIUM

(71) Applicant: Tencent Technology (Shenzhen) Company Limited, Shenzhen (CN)

(72) Inventors: Bo Liu, Shenzhen (CN); Long Liao, Shenzhen (CN); Bingqi Huang, Shenzhen (CN); Zhiqian Da, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 238 days.

(21) Appl. No.: 15/977,191

(22) Filed: May 11, 2018

(65) Prior Publication Data

US 2018/0262351 A1 Sep. 13, 2018

Related U.S. Application Data

(63) Continuation of application No. PCT/CN2017/093425, filed on Jul. 18, 2017.

(30) Foreign Application Priority Data

Jul. 20, 2016 (CN) .......................... 2016 1 0573249

(51) Int. Cl.
*H04L 9/08* (2006.01)
*H04L 9/32* (2006.01)
(Continued)

(52) U.S. Cl.
CPC ............ *H04L 9/0838* (2013.01); *G06F 16/25* (2019.01); *G06F 16/95* (2019.01); *H04L 9/3247* (2013.01);
(Continued)

(58) Field of Classification Search
None
See application file for complete search history.

(56) References Cited

U.S. PATENT DOCUMENTS

| 7,111,057 B1 | 9/2006 | Sherman et al. |
| 8,782,774 B1 * | 7/2014 | Pahl ...................... H04L 9/0825 726/15 |

(Continued)

FOREIGN PATENT DOCUMENTS

| CN | 102075570 A | 5/2011 |
| CN | 103227801 A | 7/2013 |

(Continued)

OTHER PUBLICATIONS

Chinese Office Action and Search Report, issued in Chinese Application No. 201610573249.0, dated Dec. 19, 2018, pp. 1-13, Chinese Patent Office, Beijing, China.

(Continued)

*Primary Examiner* — Henry Tsang
(74) *Attorney, Agent, or Firm* — Brinks Gilson & Lione

(57) ABSTRACT

Content delivery systems and methods are provided. A center node may determine a service domain name to be processed. The center node may obtain configuration parameters corresponding to the service domain name. The center node may generate configuration items based on the obtained configuration parameters. The configuration items may cause a plurality of edge nodes to deploy Hypertext Transfer Protocol Secure (HTTPS) security acceleration for the service domain name. The center node may send, to the edge nodes in the CDN, the configuration items that are based on the corresponding configuration parameters. The configuration item may include comprise a digital certificate providing mode and a back-to-source mode of an origin site. A first configuration parameter may correspond to the digital (Continued)

certificate providing and a second configuration parameter may correspond to a back-to-source mode of the origin site.

14 Claims, 12 Drawing Sheets

(51) Int. Cl.
*H04L 29/12* (2006.01)
*H04L 29/06* (2006.01)
*H04L 29/08* (2006.01)
*G06F 16/95* (2019.01)
*G06F 16/25* (2019.01)

(52) U.S. Cl.
CPC ........ *H04L 9/3268* (2013.01); *H04L 61/1511* (2013.01); *H04L 61/1541* (2013.01); *H04L 61/3025* (2013.01); *H04L 63/0442* (2013.01); *H04L 63/0823* (2013.01); *H04L 63/168* (2013.01); *H04L 67/101* (2013.01); *H04L 67/1008* (2013.01); *H04L 67/1031* (2013.01); *H04L 67/34* (2013.01); *H04L 61/301* (2013.01)

(56) References Cited

U.S. PATENT DOCUMENTS

| | | |
|---|---|---|
| 9,451,045 B2 | 9/2016 | Newton et al. |
| 9,509,804 B2 | 11/2016 | Stevens et al. |
| 9,647,835 B2 | 5/2017 | Gero et al. |
| 2012/0209942 A1* | 8/2012 | Zehavi ................ H04L 67/2842 709/213 |
| 2015/0067338 A1* | 3/2015 | Gero .................... H04L 63/166 713/171 |
| 2015/0188949 A1* | 7/2015 | Mahaffey .......... H04W 12/0027 726/1 |
| 2016/0014114 A1* | 1/2016 | Pahl ........................ H04L 9/083 713/156 |
| 2017/0321780 A1* | 11/2017 | Horita ..................... F16F 9/145 |

FOREIGN PATENT DOCUMENTS

| | | |
|---|---|---|
| CN | 103227801 A | 7/2013 |
| CN | 103401946 A | 11/2013 |
| CN | 104011701 A | 8/2014 |
| CN | 104081711 A | 10/2014 |
| CN | 105144725 A | 12/2015 |
| CN | 106230782 A | 12/2016 |
| WO | WO 2018/014837 | 1/2018 |

OTHER PUBLICATIONS

English translation of LarryHai6, "Tencent-Cloud CDN Introduction," Larry's Blog, dated Nov. 3, 2015, pp. 1-28, published online by Chinese Software Developer Network at URL https://blog.csdn.net/u011537073/article/details/49614297.

English translation of Zhang Ge, "Open the whole station https and solve the problem with Tencent Cloud CDN," dated Nov. 28, 2015, pp. 1-3, published online by Zhang Ge at URL https://zhangge.net/5074.html#title-0.

English translation of Yi Tuanwang, "Tencent Cloud HTTPS Settings Management," dated Jan. 5, 2016, pp. 1-2, published online by Xuzhou Yituan Network Technology Co., Ltd at URL https://www.etuan.com/zx/70-1133.html.

International Search Report with English translation, issued in International Application No. PCT/CN2017/093425, dated Oct. 12, 2017, pp. 1-4, State Intellectual Property Office of the P.R. China, Beijing, China.

* cited by examiner

| https configuration | ✕ |

| | |
|---|---|
| Type | ⦿ User-provided certificate ⓘ    ◯ CDN-provided certificate ⓘ |
| Certificate | [            ] [Browse] |
| | Only pem-format certificates are supported currently. The certificate and the private key should not be larger than 500k generally |
| Private key | [            ] [Browse] |
| | Private keys of cert and cer formats are not supported currently. The file should not be larger than 500k |
| Back-to-source manner | ⦿ http back-to-source ⓘ    ◯ https back-to-source ⓘ |
| | Once selected, the back-to-source manner cannot be changed. To change the back-to-source manner, you need to disable https and then configure again |

☐ I have read and agree with related service terms

[ OK ]  [ Cancel ]

FIG. 3

| https configuration | ✕ |

| | |
|---|---|
| Type | ◯ User-provided certificate ⓘ    ⦿ CDN-provided certificate ⓘ |
| Back-to-source manner | ⦿ http back-to-source ⓘ    ◯ https back-to-source ⓘ |
| | Once selected, the back-to-source manner cannot be changed. To change the back-to-source manner, you need to disable https and then configure again |

[ OK ]  [ Cancel ]

FIG. 4

CONTENT DELIVERY NETWORK PROCESSING METHOD, CONTENT DELIVERY NETWORK, DEVICE, AND STORAGE MEDIUM

CROSS-REFERENCE TO RELATED APPLICATIONS

This application is a continuation of International Application PCT/CN2017/093425, filed Jul. 18, 2017, entitled CONTENT DISTRIBUTION NETWORK PROCESSING METHOD, CONTENT DISTRIBUTION NETWORK, DEVICE, AND STORAGE MEDIUM, which claims priority to Chinese Patent Application No. 201610573249.0, filed Jul. 20, 2016, both of which are incorporated herein by reference in their entirety.

TECHNICAL FIELD

The present disclosure relates to the field of communications, and in particular, to a processing method based on a content delivery network (CDN), a CDN, an apparatus, and a storage medium.

BACKGROUND

A content delivery network (CDN) may include multiple edge nodes. By caching data of an origin site in the edge nodes and with proper scheduling, an access request of a user can be directed to the most suitable edge node, so that the user can obtain required data as fast as possible. The Hypertext Transfer Protocol Secure (HTTPS) is network protocol constructed by superposing the Secure Sockets Layer (SSL)/Transport Layer Security (TLS) on the Hypertext Transfer Protocol (HTTP), and can be used for encrypted transmission and identity authentication.

In order to ensure data security, an HTTPS security acceleration function for a service domain name is deployed in the CDN, to implement encrypted communication between the user and the CDN, and implement a security function while accelerating user access.

However, to deploy the HTTPS security acceleration function for a domain name, it is necessary to configure, in the CDN, a certificate issued by a Certificate Authority (CA), so as to implement mutual authentication and encrypted communication between the CDN and the user when the CDN accesses the service domain name. For the user, such a manner of obtaining a certificate is complex because the user needs to apply for the certificate. Consequently, the HTTPS security acceleration function cannot be deployed for the service domain name in time, affecting communication security.

SUMMARY

The present disclosure provides systems and methods related to communications over a CDN. An example of a first aspect of the present disclosure provides a center node. The center node may determine a service domain name to be processed. The center node may obtain configuration parameters corresponding to the service domain name. The center node may generate configuration items based on the obtained configuration parameters. The configuration items may cause a plurality of edge nodes to deploy Hypertext Transfer Protocol Secure (HTTPS) security acceleration for the service domain name. The center node may send, to the edge nodes in the CDN, the configuration items that are based on the corresponding configuration parameters. The configuration item may include comprise a digital certificate providing mode and a back-to-source mode of an origin site. A first configuration parameter may correspond to the digital certificate providing and a second configuration parameter may correspond to a back-to-source mode of the origin site.

An example of a second aspect of the present disclosure provides a content system. The content distribution may include edge nodes and a center node. The center node may convert a service domain name into a new domain name. The center node may generate a digital certificate having the new domain name. The center node may send the digital certificate to the edge nodes. The center node may receive a request communicated by a client for accessing the service domain name. The center node may redirect the request to an edge node that meets a load balancing condition in a content delivery network (CDN).

The edge node may, in response to a detection of a load balancing condition, establish an encrypted connection with a client according to the digital certificate sent by the center node. The edge node may obtain data requested by the client and send the data to the client through the encrypted connection.

Additional or alternative examples of systems, methods and apparatus are provided in the detailed description disclosed herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

FIG. 1-2 is a schematic architectural diagram of an example of at least a portion of a CDN according to an embodiment of the present disclosure;

FIG. 1-3 is a schematic architectural diagram of an example of at least a portion of a CDN according to an embodiment of the present disclosure;

FIG. 2 is a schematic flowchart of an information processing method based on an example of at least a portion of a CDN according to an embodiment of the present disclosure;

FIG. 3 is a schematic diagram of a configuration interface according to an embodiment of the present disclosure;

FIG. 4 is a schematic diagram of another configuration interface according to an embodiment of the present disclosure;

FIG. 5-1 is a schematic flowchart of a processing method based on an example of at least a portion of a CDN according to an embodiment of the present disclosure;

FIG. 5-2 is a schematic flowchart of an information processing method based on an example of at least a portion of a CDN according to an embodiment of the present disclosure;

FIG. 6-1 is a schematic flowchart of an information processing method based on an example of at least a portion of a CDN according to an embodiment of the present disclosure;

FIG. 6-2 is a schematic flowchart of an information processing method based on an example of at least a portion of a CDN according to an embodiment of the present disclosure;

FIG. 7-1 is a schematic flowchart of a CDN-based processing method provided on the basis of the example CDN architecture shown in FIG. 1-3 according to an embodiment of the present disclosure;

FIG. 7-2 is a schematic flowchart of a CDN-based processing method provided on the basis of the example CDN architecture shown in FIG. 1-3 according to an embodiment of the present disclosure;

DETAILED DESCRIPTION

Figure 1:
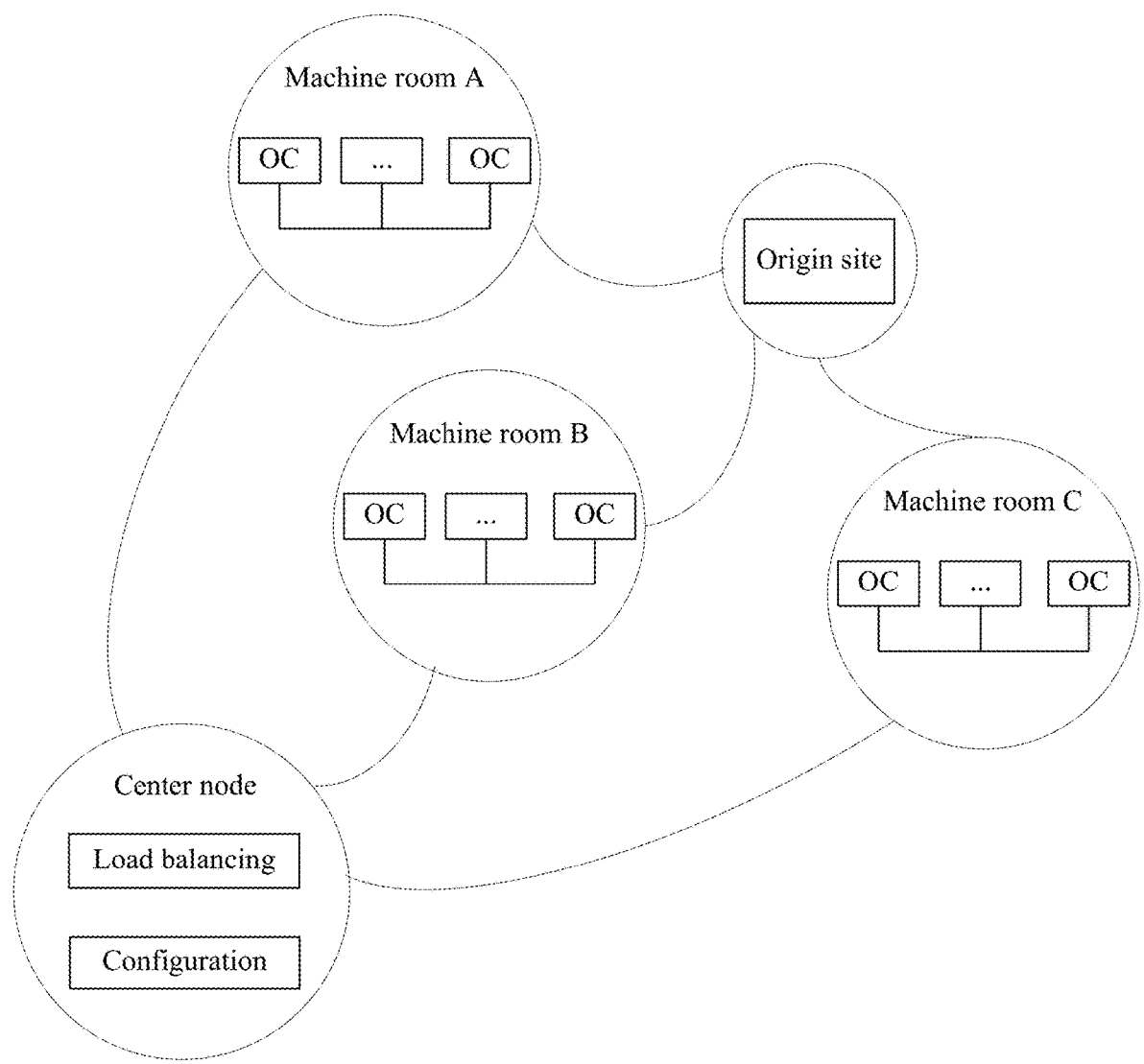
FIG. 1-1 is a schematic architectural diagram of an example of at least a portion of a CDN according to an embodiment of the present disclosure.

While various embodiments are described below, it will be apparent to those of ordinary skill in the art that many more embodiments and implementations are possible. Accordingly, the embodiments described herein are examples, not the only possible embodiments and implementations.

Before the embodiments of the present disclosure are described in detail, terms related to the embodiments of the present disclosure are described by way of examples. The terms related to the embodiments of the present disclosure are illustrated by example as follows.

Content Delivery Network (CDN)

In an example of a content delivery network (CDN), a service of requesting data nearby is provided for a user (it can be understood that, the user requests data by using a client, and for ease of description, the user and user client in the following are not specifically differentiated) by using data cached in nodes (each node may be implemented by one or more servers) scattered at various positions of the network, so as to avoid bottleneck links that may affect a response speed and stability on the Internet, and improve the response speed of providing data for the user.

Origin Site

An example of an origin site refers to an original site that publishes content. The origin site may also be referred to as an origin server. Data addition, deletion, and change are all performed at the origin site. All data cached in a CDN is a duplicate of data in the origin site. When the CDN does not cache data requested by a user, the CDN obtains the data from the origin site to respond to the request of the user.

Examples of Center Node, Edge Node, Outer Center (OC) Node, Intermediate Origin Server A node refers to a network or computing unit in a CDN, and is implemented by a server or a server cluster. The nodes may include at least the following types of nodes, a center node and/or one or more edge nodes.

A center node may monitor a status (availability, and a congestion degree) of edge nodes; redirect a request of a user to an edge node meeting a load balancing condition according to a distance from each edge node to the user, the status of each edge node, and a global load balancing strategy, so that the edge node responds to the request of the user; and synchronize data cached by the edge node with an origin site.

Edge nodes may refer to nodes configured to cache data of the origin site according to a cache strategy. There are at least two types of edge nodes herein, an outer center (OC) node and an intermediate origin server.

The an outer center (OC) node may refer to a node that caches data from the origin site, where the OC node is the first node used for querying the data requested by the user, and therefore is also referred to as a first-level cache node.

The intermediate origin server may refer to a server located at an intermediate level between the origin site and the edge node. The intermediate origin server is a node used for responding to the request of the user when the edge node does not cache the data requested by the user, and therefore is also referred to as a second-level cache node. The intermediate origin server reduces the number of times of back-to-source, and therefore can reduce resource overheads of the origin site due to responding to the request of the user.

Examples of Back-to-Source Mode, HTTP Back-to-Source, HTTPS Back-to-Source

Back-to-source refers to a situation arising when data requested by a user is obtained from an origin site directly due to various reasons (for example, a CDN does not cache the corresponding data, or data cached in the CDN has expired).

Back-to-source modes are manners of requesting data from an origin site. Back-to-source modes may include a HTTP back-to-source mode and a HTTPS back-to-source mode.

A HTTP back-to-source mode refers to a manner of requesting data from the origin site by means of HTTP, for example, a request carrying an Internet Protocol (IP) address: http://<IP address>+<data location>+<data name>, or a request carrying a domain name: http://<domain name>+<data location>+<data name>.

A HTTPS back-to-source manner refers to a manner of requesting data from the origin site by means of HTTPS, for example, https://<IP address>+<data location>+<data name>, or https://<domain name>+<data location>+<data name>.

Certificate

A certificate, such as, a digital certificate, may refer to a digital credential of a domain name owned by an origin site of a user, and includes a domain name, a validity period (optional), a public key of an asymmetric encryption algorithm, and a digital signature. The digital signature is obtained after a digest of the domain name and the validity period (optional) is encrypted by using a private key.

Examples of Service Domain Name, CDN Domain Name, Back-to-Source Domain Name

In general, a domain name refers to a name of a computing device, and is formed by a string of names in a predetermined format, such as separated by dots.

A service domain name includes a domain name with respect to a particular service. A user can access the service domain name to obtain data. The service domain name is applicable to a situation where an origin site provides different services. An administrative user of the origin site can set a service domain name for each service of the origin site. Using an origin site whose domain name is www.qq.com as an example, www.mail.qq.com can be set as a service domain name for an email service, and data of a site whose service domain name is www.mail.qq.com comes from the origin site whose domain name is www.qq.com.

A CDN domain name may include a domain name allocated in the CDN after a CDN function is deployed for the service domain name and uniquely identify the service domain name in the CDN. In a domain name parsing service (a mapping relationship between CDN domain names and IP addresses of center nodes is stored), the service domain name is set as another name for the CDN domain name. As such, any request that carries a CDN domain name or a service domain name can be redirected by the domain name parsing service to a center node of a CDN for processing.

A back-to-source domain name may include a domain name used by a CDN to request data from an origin site when a request carrying a service domain name does not hit any data cached in the CDN, and therefore is also known as a domain name of the origin site.

Example of CDN Function

A CDN function may provide a cache service for an origin site that accesses the CDN. The CDN caches data of the origin site to respond to a request of a use. According to different content cached by the CDN, such as static content and downloaded content (such as an application installation package), access and downloading can be accelerated while reducing the number of times of returning to the origin sites and reducing overheads of the origin site.

Example of HTTPS Security Acceleration

An HTTPS security acceleration or an HTTP security acceleration function refers to using HTTPS communication between a user and a CDN, including using HTTPS when the user sends a request to the CDN and when the CDN responds to the user. For example, a user and an edge node communicate with each other based on the HTTP; according to the stipulation of the SSL/TLS, the edge node of the CDN and the user authenticate each other by using certificates and negotiate a session key, and then carry out encrypted communication by using the negotiated session key.

Example of Configuration Items

Configuration items refer to information configured or set in edge nodes of a CDN when a CDN function and an HTTPS security acceleration function are provided for an origin site accessing the CDN. A configuration item consists of a configuration item name and a configuration parameter.

Caching data of an origin site in the edge nodes and with scheduling, an access request of a user may be directed to the most suitable edge node, so that the user can obtain required data as fast as possible. The Hypertext Transfer Protocol Secure (HTTPS), which refers to a network protocol constructed by superposing the Secure Sockets Layer (SSL)/Transport Layer Security (TLS) on the Hypertext Transfer Protocol (HTTP), may be used for encrypted transmission and identity authentication. To ensure data security, an HTTPS security acceleration function for a service domain name may be deployed in the CDN, to implement encrypted communication between the user and the CDN and/or to implement a security function while accelerating user access.

Deployment of the HTTPS security acceleration function for a domain name, may involve configuration, in the CDN, of a certificate issued by a Certificate Authority (CA). The configured certificate may enable authentication and encrypted communication between the CDN and the user when the CDN accesses the service domain name. For the user, such a manner of obtaining a certificate is complex because the user needs to apply for the certificate, which may cause delays affecting communication security.

One technical advancement of the systems and methods described may be that a control node may coordinate efficient configuration, deployment, and management of an HTTPS security acceleration function for a service domain name in a CDN. Additional or alternative benefits, efficiencies, and improvements over existing market solutions are made evident in the system, apparatus, and methods described below.

Implementation of providing a CDN function for a service domain name accessing a CDN is described in the following with reference to the schematic architectural diagrams shown in FIG. 1-1 to FIG. 1-3.

Referring to FIG. 1-1, FIG. 1-1 is a schematic architectural diagram of a CDN according to an embodiment of the present disclosure. A CDN that provides a cache service for an origin site described in this embodiment of the present disclosure includes: an OC layer and a center node, which are described separately.

A user client initiates an HTTP-based request. A domain name parsing service (for example, a domain name parsing server pre-configured in the user client) redirects the request of the user to a center node according to a mapping relationship between service domain names and IP addresses of center nodes. The center node provides a global load balancing function, carries out comprehensive analysis according to an IP address, a geographical location and a network access type of the user, a node status (such as availability and a congestion degree), and other information, to obtain an IP address of an optimal OC-layer edge node for responding to the request, and redirects the request of the user to the corresponding edge node.

In an example, the center node is responsible for load balancing of each edge node to ensure working efficiency of each edge node. The edge nodes are responsible for storing data of a customer's website (the origin site). Under the control of the center node, a request of a user is redirected to an edge node meeting a load balancing condition. For example, weights of the edge nodes are calculated from the following two aspects: the length of a transmission link between the user and each edge node, and load of each edge node. An edge node with a smallest weight is selected. The selected edge node responds to the request of the user like an original server of the customer's website. If the edge node is configured to cache static resource files such as Cascading Style Sheets (CSS) and pictures, when these frequently accessed files are cached in the CDN, the response speed is faster because the transmission link or the communications delay between the edge node and the user is shorter than a transmission link between the origin site and the user. The communications delay is defined as a latency or a time delay between two nodes in a communication network. In other examples, the length of the transmission distance may be based on a number of the number of hops between the user and the edge node, a physical distance between the user and the edge node, and/or other measures of network distance.

The OC layer includes an edge node serving as a first-level cache node. The request of the user is first processed by the edge node at the OC layer. When data requested by the user is not cached in the OC layer, the OC layer goes back to the origin site. That is, the OC layer obtains, from the origin site (for example, the OC layer goes back to the source by using a domain name of the origin site), the data requested by the user, and returns the data to the user. The OC layer caches, according to the cache strategy, the data requested by the user. The cache strategy may be used for indicating different cache periods of different types of data in the CDN, and data of any type will be deleted after the cache period expires.

The center node further provides a front-end function, and provides the user with a configuration interface (which is also referred to as a console interface of the CDN) for managing and maintaining the CDN. For example, the center node receives a user-specified service domain name for which an HTTPS security acceleration function needs to be enabled as well as configuration parameters that are set for configuration items of the service domain name. The user carries out setting by using an HTTP or HTTPS access configuration interface provided by the center node. Definitely, as an alternative solution of receiving user configuration through a configuration interface, the center node may negotiate an identifiable configuration indication format with the user client in advance. The user client fills configuration parameters in the indication and then sends the indication to the center node. In this way, bandwidth for transmitting a graphical interface between the user client and the center node can be saved.

Figures 1, 2:
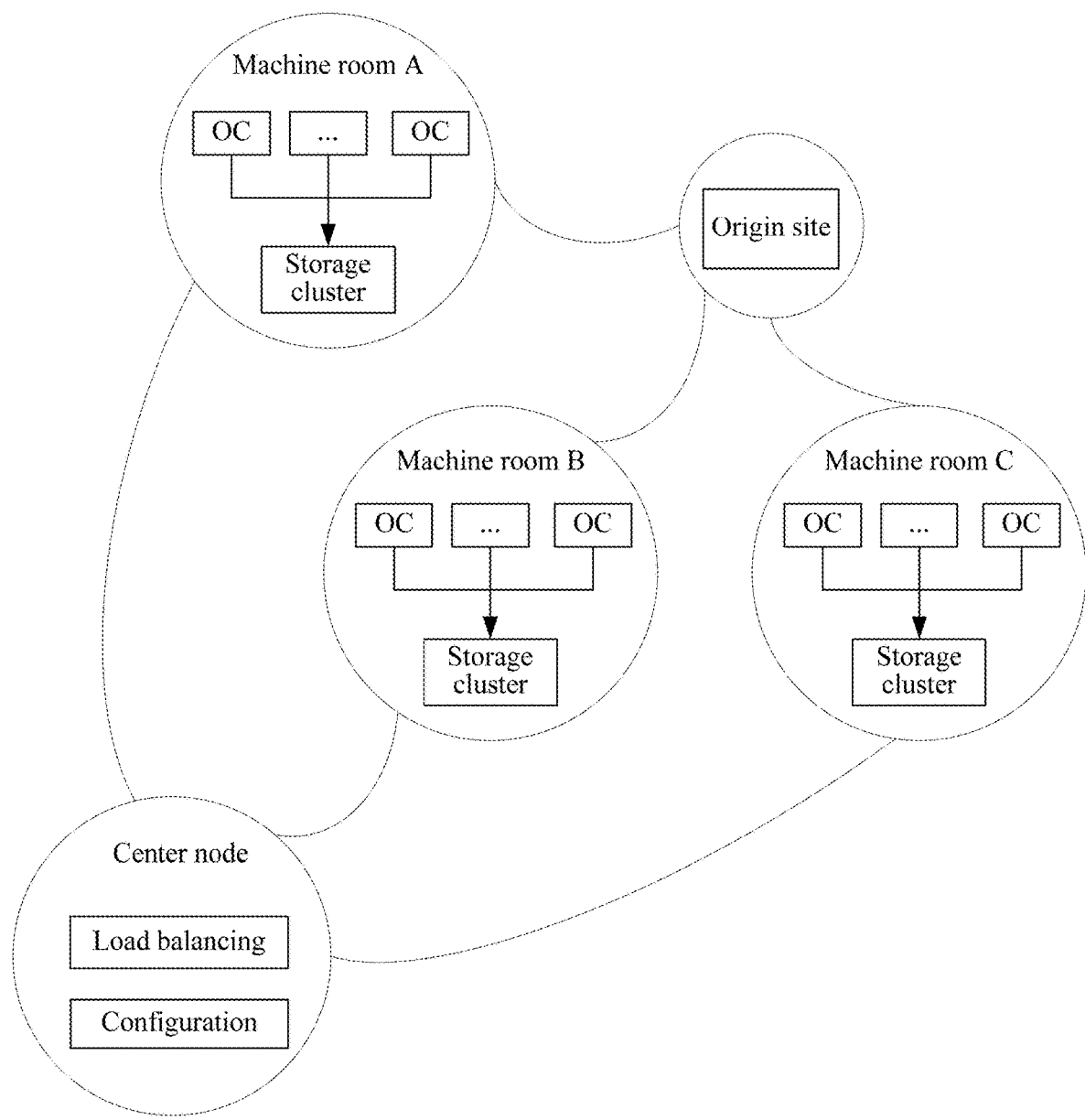

Referring to FIG. 1-2, FIG. 1-2 is a schematic architectural diagram of a CDN according to an embodiment of the present disclosure. Based on FIG. 1-1, an OC layer described in this embodiment of the present disclosure may further include a storage cluster.

Due to a limited capacity of the OC layer, data that needs to be cached for a request of a user near a machine room (for example, a user having a shorter transmission link to the machine room with respect to other machine rooms) is stored in the storage cluster. If the OC layer does not cache the data requested by the user, the OC layer obtains, from the storage cluster, the data requested by the user. If the storage cluster does not store the data requested by the user, the OC layer goes back to the origin site to obtain the data requested by the user, and return the data to the user. The OC layer and the storage cluster cache, according to a cache strategy, data requested by the user; when a user requests the same data next time, the data can be directly returned to the user.

Figures 1, 2, 3:
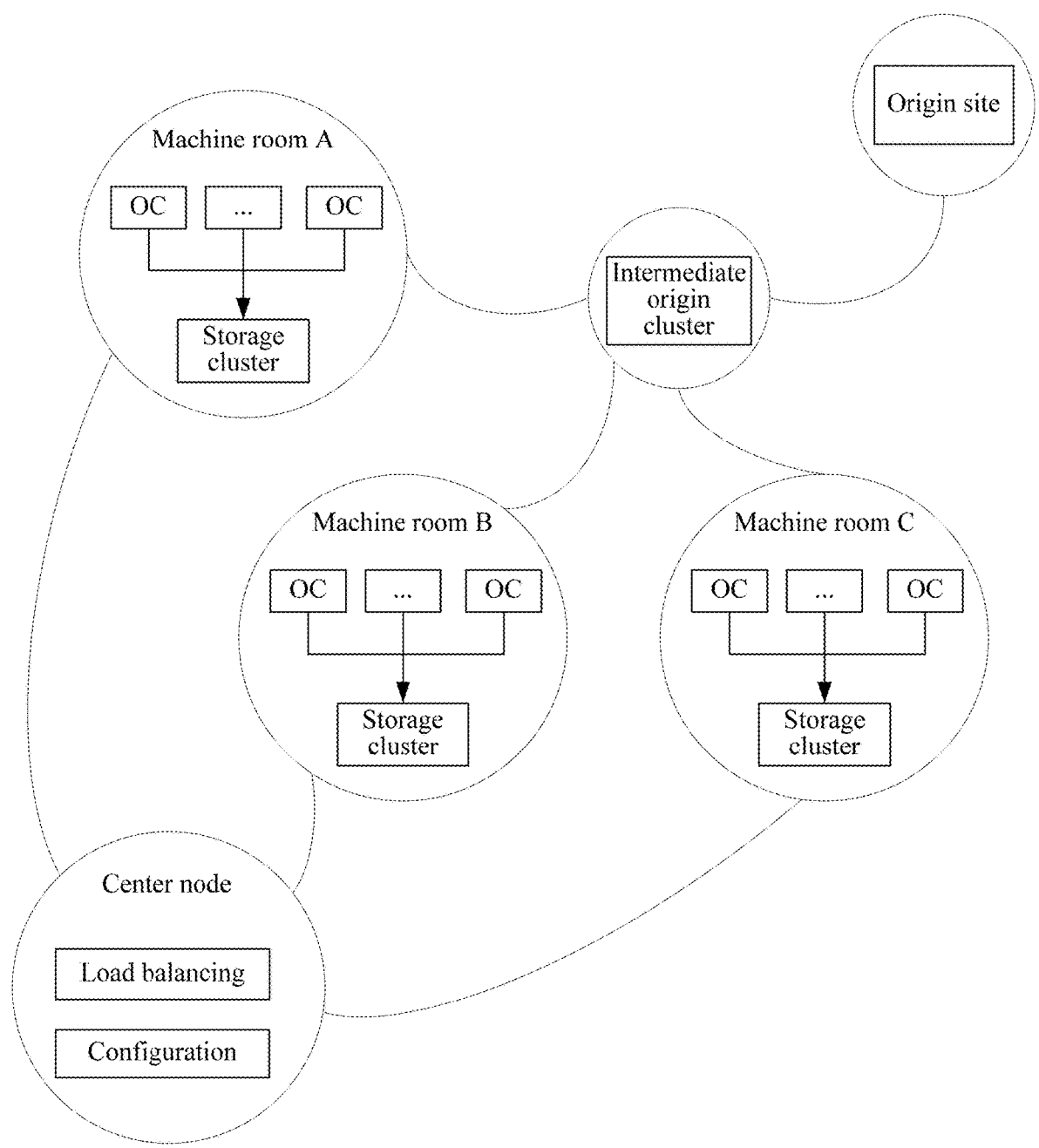
Figure 2:
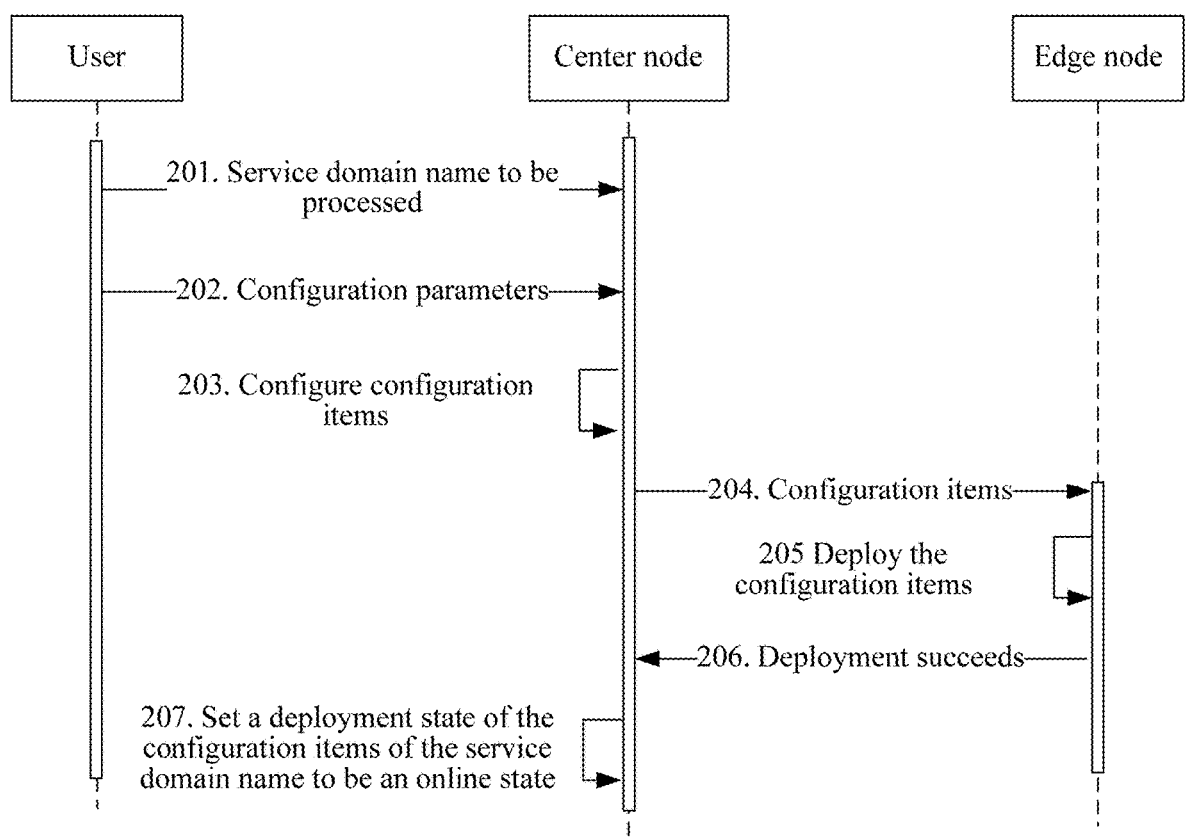

Referring to FIG. 1-3, FIG. 1-3 is a schematic architectural diagram of a CDN according to an embodiment of the present disclosure. Based on the CDN described in this embodiment of the present disclosure may further include an intermediate origin cluster.

The intermediate origin cluster includes an intermediate origin server serving as a second-level edge node. If the OC layer does not store the data requested by the user either (neither the edge node of the OC layer nor the storage cluster stores the data requested by the user), the OC layer obtains, from the intermediate origin cluster, the data requested by the user. If the intermediate origin cluster does not store the data requested by the user either, the intermediate origin cluster obtains, from the origin site in an HTTP back-to-source mode, the data requested by the user and returns the data to the user. Meanwhile, the OC layer and the intermediate origin cluster cache, according to the cache strategy, the data requested by the user; when a user requests the same data next time, the data can be directly returned to the user.

In conclusion, in the CDN according to the embodiments of the present disclosure, the storage cluster and the intermediate origin cluster may be omitted, or one of the storage cluster and the intermediate origin cluster may be disposed, or both the storage cluster and the intermediate origin cluster may be disposed according to a service characteristic, an actual user requirement, or other factors. The CDN includes at least an OC layer and a center node. For example, if the CDN is only provided with an OC layer and a center node, an edge node in the OC layer is first used for responding to a request of a user, and when the OC layer does not cache data requested by the user, the OC layer goes back to an origin site to obtain the data requested by the user, and returns the data to the user.

That the CDN shown in FIG. 1-1 to FIG. 1-3 provides a CDN function for a service domain name of an origin site is further described. To deploy a CDN function for a service domain name of an origin site, the center node provides a configuration interface for an administrative user of the service domain name, receives configuration of the administrative user for the service domain name, where the configuration includes the configuration items shown in Table 1, and synchronizes the configuration to the edge nodes of the CDN. Each edge node sends a deployment success notification message to the center node after deploying the configuration items issued by the center node for the service domain name. After receiving notification messages returned by all the edge nodes, the center node sets a state of each configuration item of the service domain name to be an online state. So far, deployment of the CDN function for the service domain name has been completed.

For configuration items that need to be set for deploying a CDN function for a service domain name, refer to Table 1:

TABLE 1

| Configuration item name | Descriptions | Configuration parameter |
| --- | --- | --- |
| HOST_ID | It represents a serial number (ID) of a service domain name, and a unique identifier of a service domain name deployed in a CDN. | 5303 |
| UPSTREAM | It represents a back-to-source domain name, namely, a domain name of an origin site. | www.qq.com |
| CDN_HOST | It represents a CDN domain name, which is a domain name deployed for an origin site in a CDN, and is set as another name for a service domain name in a domain name parsing server. | cosabc.cdn.dnsv1.com |
| HOST | It represents a service domain name, namely, a domain name used by an origin site when provided with a service by a user. | static.orangeholic.cn |
| STRATEGY | It is a cache strategy. | a cache period of 300 seconds for JavaScript, and a cache period 86400 seconds for CSS |

To deploy a CDN function for a service domain name, the center node needs to configure five configuration items shown in Table 1 for the service domain name, that is, the ID of the service domain name, the back-to-source domain name, the CDN domain name, the service domain name and the cache strategy, and synchronize the configuration items to the nodes of the CDN, including the edge nodes in the OC layer as well as the intermediate origin server in the intermediate origin cluster, as shown in FIG. 1-3. The service domain name ID is allocated by the center node, and configuration parameters of other configuration items are set according to user inputs.

It should be noted that, the back-to-source domain name shown in Table 1 may also be replaced with a back-to-source IP address. The domain name parsing server can parse the back-to-source domain name to obtain the back-to-source IP address. In addition, each service domain name is further configured with a status flag for representing a deployment stage of the service domain name. For example, the deployment stages include: initialization, deployment, online, and offline.

An example of providing a CDN function on the basis of the configuration items shown in Table 1 for node deployment in the CDN is described in the following.

A user initiates a request carrying a service domain name by using a client, where the request is http://static.orangeholic.cn/page1, and is used for requesting page data named "page1". If an IP address to which the domain name is mapped is not found in the user client locally, the request is submitted to the domain name parsing server. The domain name parsing server finds, according to a stored mapping relationship between domain names and IP addresses, an IP address of a center node to which the domain name static-.orangeholic.cn is mapped, and therefore redirects the request of the user to the center node. The center node determines, according to a global load balancing strategy, an IP address of an edge node for responding to the request, and redirects the request of the user to the corresponding edge node. The edge node responds to the request of the user first.

As described above, because the CDN domain name is already set as another name for the service domain name in the domain name parsing service, for the domain name parsing server, the CDN domain name carried in the request http://cosabc.cdn.dnsv1.com/page1 submitted by the user client is equivalent to the service domain name static.orangeholic.cn. Therefore, the domain name parsing server can redirect the request of the user to the center node. The center node determines, according to the global load balancing strategy, an IP address of an edge node for responding to the request of the user, and redirects the request of the user to the corresponding edge node for processing.

Using the CDN shown in FIG. 1-3 as an example, if the page data of page1 is not cached in the edge node, the edge node searches for the page data of page1 in the storage cluster. If the page data is found, the storage cluster returns the page data, and the page data of page1 is cached in the edge node. If the page data is still not found, the edge node searches for the page data of page1 in the storage cluster. If the page data is not found, the edge node continues to search for the page data of page1 in the immediate origin cluster. If the page data is found, the page data is returned to the user client; the edge node and the storage cluster cache the page data of page1. If the page data is not found, the edge node requests the page data of page1 from the origin site according to the back-to-source domain name: www.qq.com configured on the edge node, returns the page data of page1 to the client, and caches the page data of page1.

The edge node controls cache periods of different types of data according to the cache strategy, and deletes corresponding data after expiration. Using the cashed page data of page1 as an example, in management based on the cache strategy, JavaScript of page1 is cashed for 300 seconds, and is deleted after expiration; a CSS file of page1 is cached for 86400 seconds, and is deleted after expiration.

So far, a process of implementing configuration items of a CDN function and implementing the CDN function by using node configuration in the CDN provided in the embodiments of the present disclosure has been described. In the foregoing process of implementing the CDN function, the CDN and the user communicate with each other by using the HTTP. In order to ensure data security, it is necessary to use the HTTPS in such communication processes that the user initiates a request for a service domain name to the CDN and that the CDN returns requested data to the user. On one hand, rapid access to the service domain name can be implemented by using the CDN; on the other hand, the use of the HTTPS can ensure data security, thereby implementing an HTTPS security acceleration function for the service domain name.

However, in order to deploy the HTTPS security acceleration function for the service domain name, an administrative user of the service domain name needs to submit, to the CDN, a certificate issued by a certificate authority (CA). Mutual authentication and negotiation of a session key are implemented between the CDN (including the center node and the edge node) and the user on the basis of the certificate, and encrypted communication is further implemented on the basis of the negotiated session key. Such an operation of obtaining the certificate is complex. It is also possible that the HTTPS security acceleration function cannot be deployed for the service domain name as quickly as possible because the certificate cannot be obtained in time, affecting data security.

To resolve the foregoing problem, for a service domain name for which an HTTPS security acceleration function needs to be deployed, this embodiment of the present disclosure provides a solution of automatically generating a certificate for the service domain name in the CDN and deploying the certificate in the CDN. Besides, the solution also allows the administrative user of the service domain name to submit a certificate to the CDN. In addition, the solution supports the administrative user of the service domain name to flexibly set a back-to-source mode according to requirements.

Further referring to the CDN shown in FIG. 1-1 to 1-3, the process of deploying an HTTPS security acceleration function for a service domain name is described. Referring to FIG. 2, FIG. 2 is a schematic flowchart of CDN-based processing provided on the basis of the CDN architectures shown in FIG. 1-1, FIG. 1-2 and FIG. 1-3. When an HTTPS security acceleration function further needs to be configured for a service domain name already configured with a CDN function, the processing method based on a CDN described in this embodiment of the present disclosure includes the following steps:

Step 201: A center node of a CDN determines a service domain name to be processed.

In some feasible implementations, for a service domain name already deployed with a CDN function, the center node further supports deployment of an HTTPS security acceleration function. In an example of determining a service domain name that needs to be configured with an HTTPS security acceleration function, the center node of the CDN may determine, according to a selection of a user, a service domain name to be processed (that is, to be deployed with the HTTPS security acceleration function) from a list of service domain names already deployed with the CDN function. Alternatively, the center node of the CDN determines a service domain name, which is manually input by a user and deployed with the CDN function, as the service domain name to be processed.

Step 202: The center node of the CDN obtains, by using a configuration interface, configuration parameters that are input by a user for configuration items of the service domain name.

In some feasible implementations, for a service domain name already deployed with the CDN function, the center node can continue to deploy an HTTPS security acceleration function. Configuration items shown in Table 2 below further need to be set based on the configuration items related to the CDN function shown in Table 1:

TABLE 2

| Configuration item name | Descriptions | Configuration parameter |
|---|---|---|
| HTTPS_TYPE | It represents a certificate providing mode, including self-provision and provision-by-CDN. | Provision by CDN |
| PARENT_ID | When a certificate is provided by the CDN, the CDN would create a new domain name by using a user-specified domain name (such as a back-to-source domain name) as a template domain name, and this configuration item represents an ID of the template domain name. | 5303 |
| CERT | It represents certificate content (or a certificate path) for HTTPS deployment. | |
| ORGIN_TYPE | It represents a back-to-source mode of an origin site, including HTTP back-to-source and HTTPS back-to-source. | HTTPS |

As shown in Table 2, configuration items whose configuration parameters need to be set by the user include: the certificate providing mode and the back-to-source mode of the origin site. That is, for the service domain name, the administrative user of the service domain name at least needs to set configuration parameters of the two configuration items: the certificate providing mode and the back-to-source mode of the origin site.

For example, the certificate providing mode may be either provision-by-user (that is, the administrative user) or provision-by-CDN. If the certificate providing mode is provision-by-user, it means that the user applies for a certificate for the service domain name from a CA, and uploads the certificate to the center node. If the certificate providing mode is provision-by-CDN, it means that the CDN (such as the center node) generates a corresponding certificate for the service domain name.

The configuration parameters of the configuration item PARENT_ID and the configuration item CERT are related to the certificate providing mode.

When the certificate providing mode is set to be provision-by-user, the center node further needs to receive a certificate path that is set by the administrative user in the configuration item CERT. The center node read the user-provided certificate according to the certificate path. The configuration item PARENT_ID is null.

When the certificate providing mode is set to be provision-by-CDN, after generating a certificate for the service domain name, the center node automatically fill content of the generated certificate in the configuration item CERT. For the administrative user-specified service domain name for which the HTTPS security acceleration function needs to be deployed, the center node further needs to set an ID of the service domain name as the configuration parameter of the configuration item PARENT_ID.

As described above, the back-to-source mode of the origin site may be either HTTP back-to-source or HTTPS back-to-source. The certificate providing mode and the back-to-source mode can be combined randomly. Therefore, for the certificate providing mode and the back-to-source mode of the origin site, there are four different combinations of configuration parameters: 1) certificate providing mode: provision-by-user, and back-to-source mode: HTTP; 2) certificate providing mode: provision-by-CDN, and back-to-source mode: HTTP; 3) certificate providing mode: provision-by-user, and back-to-source mode: HTTPS; 4) certificate providing mode: provision-by-CDN, and back-to-source mode: HTTPS. The user can set a specific combination according to an actual requirement.

In an example, the center node provides a front-end function. The administrative user of the service domain name accesses, by using the client, the configuration interface provided by the center node, to obtain configuration parameters set by the user for the configuration items. An optional display schematic diagram of the configuration interface may be as shown in FIG. 3 and FIG. 4. A combination selected by the user in FIG. 3 is: the certificate providing mode is provision-by-user (namely, self-provision), and the back-to-source mode of the origin site is HTTP back-to-source. A combination selected by the user in FIG. 4 is: the certificate providing mode is provision-by-CDN (that is, the certificate is provided by the CDN), and the back-to-source mode of the origin site is HTTP back-to-source. It should be noted that, an actual display form of the configuration interface is not limited to that shown in FIG. 3 and FIG. 4. In addition, the center node also supports setting a configuration parameter indication to set the configuration parameters, and setting the configuration parameters shown in Table 1 and Table 2 in a non-graphical manner. This embodiment of the present disclosure does not exclude other manners that can be used for setting configuration parameters In some feasible implementations, for the administrative user-specified service domain name for which the HTTPS security acceleration function needs to be deployed, the center node of the CDN first determines whether the service domain name is already deployed with the HTTPS security acceleration function. If the service domain name is not deployed with the HTTPS security acceleration function, the center node of the CDN obtains configuration parameters that the user inputs for the service domain name by using the configuration interface. If the service domain name is already deployed with the HTTPS security acceleration function, the center node of the CDN may output prompt information to the user client, for example, "The service domain name has already deployed with the HTTPS security acceleration function. Please do not deploy again!"

Step 203: The center node of the CDN configures the configuration items according to the obtained configuration parameters, the configuration items being used for deploying an HTTPS security acceleration function for the service domain name.

As described above, the center node may obtain, by using the configuration interface shown in FIG. 3 and FIG. 4, the configuration parameters shown in Table 2 that are set by the administrative user of the service domain name for the configuration items of the service domain name.

Step 204: The center node of the CDN sends the configured configuration items to edge nodes in the CDN.

Step 205: The edge nodes separately deploy the configuration items for the service domain name.

Step 206: Each edge node sends a deployment success notification message to the center node of the CDN after the deployment succeeds.

Step 207: The center node of the CDN sets a deployment state of each configuration item of the service domain name to be an online state when confirming that deployment success notification messages sent by all the edge nodes are received.

So far, an operation of deploying the HTTPS security acceleration function for the service domain name has been completed.

In this embodiment of the present disclosure, a function of setting configuration items for a user-deployed HTTPS security acceleration function is provided for an administrative user of a service domain name. For example, by using a configuration interface, a user can set configuration parameters, so that configuration items are configured according to the configuration parameters, and then the configured configuration items are sent to edge nodes in the CDN. The edge nodes separately deploy the configured configuration items, to complete deployment of the HTTPS security acceleration function for the service domain name. For a certificate providing mode and a back-to-source mode of an origin site, the user can set different combinations, thereby implementing a flexible certificate providing mode and a flexible back-to-source mode of the origin site, fully meeting diversified requirements during deployment of the HTTPS security acceleration function in the CDN. In addition, the back-to-source mode of the origin site may be HTTPS back-to-source, so that the origin site using the HTTPS can deploy the HTTPS security acceleration function in the CDN without any difficulty.

In the following, when the administrative user of the service domain name sets the configuration items for deploying the HTTPS security acceleration function and the set certificate providing mode is provision-by-CDN, a process of generating a certificate and deploying the configuration items is described.

Figures 1, 5:
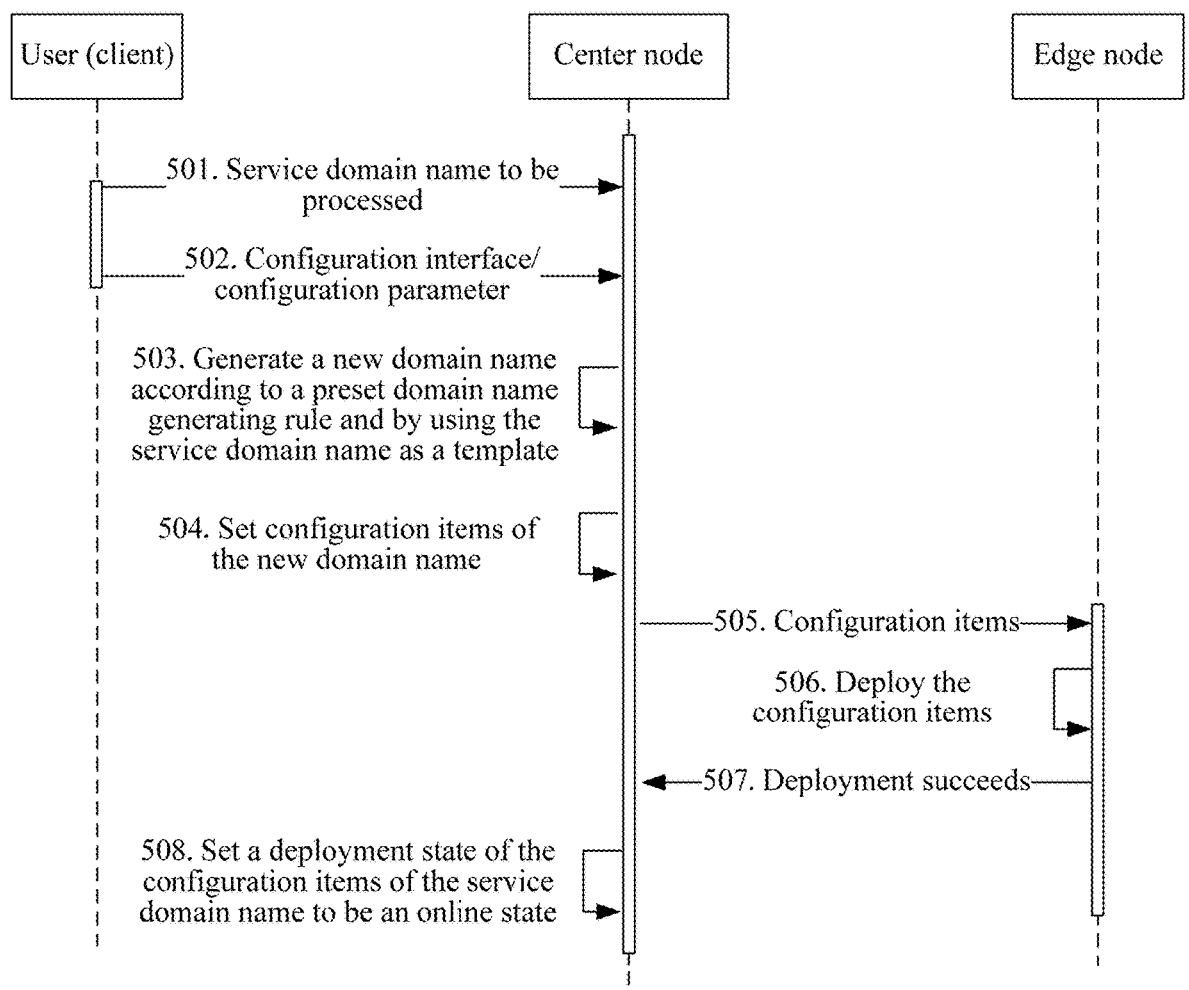
Figures 2, 5:
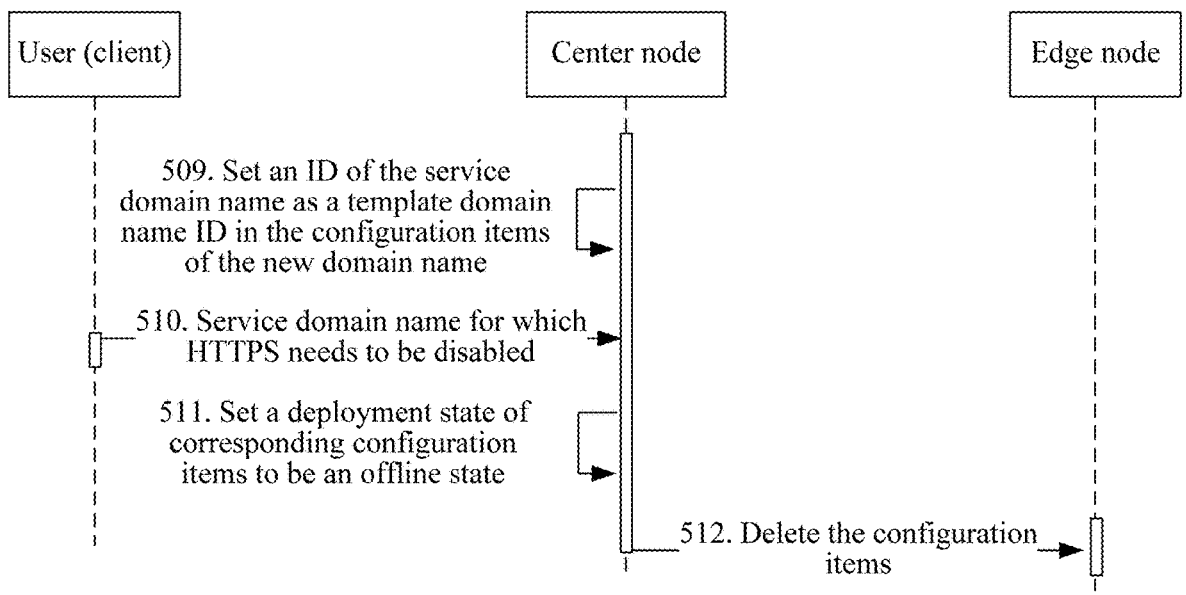

Referring to FIG. 5-1, FIG. 5-1 is a schematic flowchart of CDN-based processing provided on the basis of the CDN architecture shown in FIG. 1-3 according to an embodiment of the present disclosure. When the certificate providing mode is provision-by-CDN, in the process of generating a certificate and deploying configuration items, the processing method based on a CDN described in this embodiment of the present disclosure includes the following steps:

Step 501: A center node of a CDN receives a user-specified service domain name to be processed, that is, a service domain name for which an HTTPS security acceleration function needs to be deployed.

Step 502: The center node of the CDN obtains, by using a configuration interface, configuration parameters that are input by the user for the service domain name to be processed.

Step 503: When a certificate providing mode is provision-by-CDN, the center node of the CDN generates a new domain name according to a preset domain name generating rule and by using the service domain name as a template, configuration items of the new domain name being inherited from configuration items of the service domain name (that is, the original service domain name used for generating the new domain name).

When the certificate providing mode is provision-by-CDN, the center node sets the configuration items of the service domain name in the following manner: setting a certificate providing mode in the configuration items of the service domain name to be provision-by-CDN, and setting a back-to-source mode of an origin site to be HTTP back-to-source or HTTPS back-to-source according to the setting input by the user.

In some feasible implementations, if the certificate providing mode received by the center node is provision-by-CDN, the CDN needs to generate a certificate for the service domain name. Using generating a certificate by the center node as an example, in order to effectively differentiate and conveniently manage the certificate generated by the center node for the service domain name and a certificate that is applied for from a CA by the administrative user for the service domain name, the certificate generated by the center node for the service domain name does not carry the service domain name directly, but carries a new domain name formed by converting the service domain name (that is, the service domain name is used as a template domain name for conversion), and configuration items of the new domain name are inherited from the original service domain name. By deploying the configuration items of the new domain name and the certificate to the node, the HTTPS security acceleration function can be deployed for the service domain name.

In order to perform conversion by using the service domain name as a template domain name to form a new domain name, it is possible to convert the service domain name and combine a conversion result with a specific domain name suffix (which definitely may also be used as a prefix) to form a new domain name. The new domain name is unique in the CDN, so that the new domain name formed by converting the service domain name can be recognized by the CDN. The configuration items of the new domain name are inherited from the service domain name. That is to say, configuration parameters of the configuration items of the new domain name are the same as configuration parameters of the corresponding configuration items of the service domain name (the service domain name from which the new domain name is generated).

The domain name generating rule is used for generating, based on a service domain name, a new domain name different from existing domain names in the CDN. The preset domain name generating rule may be: changing "." in the service domain name to be "_", eliminating other non-alphabetic characters and non-numeric characters, adding a serial number and a domain name suffix, and separating the serial number from the adjacent character in front by using "_", and separating the serial number from the domain name suffix by using "."

For another example, if the service domain name is www.qq_q.com and the domain name suffix is qcloudcdn.com, a new domain name obtained according to the preset domain name generating rule is www_qqq_com_1.qcloudcdn.com. If www_qqq_com_1.qcloudcdn.com already exists in the CDN, the serial number is incremented automatically, and it is further determined whether the new domain name already exists in the CDN, that is, www_qqq_com_2.qcloudcdn.com, www_qqq_com_3.qcloudcdn.com, . . . are generated, until a domain name that does not exist in the CDN currently is found. Assuming that www_qqq_com_3.qcloudcdn.com does not exist in the CDN currently, www_qqq_com_3.qcloudcdn.com can be determined as the new domain name.

It should be noted that, the preset domain name generating rule above is merely an example for description. Any rule that can be used for generating a new domain name different from existing domain names in the CDN can be used as the domain name generating rule. It can be seen that the preset domain name generating rule may be adjusted according to an actual situation, and this embodiment of the present disclosure does not exclude other domain name generating rules.

Step 504: The center node of the CDN sets the configuration items of the new domain name.

Configuration parameters of the configuration items of the new domain name are consistent with the configuration parameters of the configuration items of the service domain name. The certificate providing mode in the configuration items of the new domain name is set to be provision-by-CDN, the back-to-source mode of the origin site is set to be HTTP back-to-source or HTTPS back-to-source (depending on the configuration item of the back-to-source mode of the service domain name), and certificate content is set to be a CDN-provided certificate.

A certificate generated by the CDN for the new domain name may be a certificate generated by the CDN and carrying a domain name "conversion result of the service domain name+specific domain name suffix (such as the foregoing qcloudcdn.com)".

Still using the foregoing example, when the service domain name for which the HTTPS security acceleration function needs to be deployed is: www.qq_q.com, and the new domain name formed according to the domain name generating rule is www_qqq_com_3. qcloudcdn.com, the certificate for the new domain name carries the domain namewww_qqq_com_3. qcloudcdn.com, and further carries a public key of an asymmetric encryption algorithm as well as a digital signature.

Step 505: The center node of the CDN sends the configured configuration items of the new domain name to edge nodes in the CDN.

Step 506: The edge nodes separately deploy the configured configuration items of the new domain name, to complete deployment of the HTTPS security acceleration function for the service domain name.

As described above, the deployment of the HTTPS security acceleration function for the service domain name is implemented by using the configuration items of the new domain name generated for the service domain name. The center node of the CDN sends the configured configuration items of the new domain name to the edge nodes in the CDN. Because the new domain name inherits the configuration items of the original service domain name, an effect of deploying the HTTPS security acceleration function for the service domain name by deploying the configuration items of the new domain name is achieved In an example of deploying the configuration items of the service domain name, in addition to setting the configuration items of the service domain name to be in an enabled state, the center node further updates a domain name parsing service of the node: setting the CDN domain name in the configuration items as another name for the service domain name. In the example shown in Table 1, the service domain name static.orangeholic.cn in the mapping relationship of the domain name parsing server is selected and is set as another name for the CDN domain name cosabc.cdn.dnsv1.com. In this way, whether a request of a user carries a service domain name such as https://static.orangeholic.cn/page1, or carries a service domain name such as https://cosabc.cdn.dnsv1.com/page1, the domain name parsing service can find an IP address to which the CDN domain name is mapped in the mapping relationship between CDN domain names and IP addresses of center nodes, and redirect the request of the user to the center node.

Step 507: The edge nodes separately deploy the configuration items for the new domain name, and send deployment success notification messages to the center node of the CDN after the deployment succeeds.

Step 508: The center node of the CDN sets a deployment state of each configuration item of the new domain name to be an online state when confirming that the deployment success notification message sent by each edge node is received, thus completing deployment of the HTTPS security acceleration function for the service domain name.

Continuing with FIG. 5-1, processing when the center node determines to disable the HTTPS security acceleration function deployed for the center node is described continuously. Referring to FIG. 5-2, FIG. 5-2 is a schematic flowchart of CDN-based processing provided on the basis of the CDN architecture shown in FIG. 1-3 according to an embodiment of the present disclosure. When the center node determines to disable the HTTPS security acceleration function deployed for the service domain name, the method includes the following steps:

Step 509: The center node sets an ID of a service domain name as a template domain name ID in configuration items of each new domain name.

In this way, according to a configuration item already configured with the HTTPS security acceleration function, it can be easily known which service domain name is used as a template domain name for conversion into the new domain name.

Step 510: The center node receives a user-specified service domain name whose HTTPS security acceleration function needs to be disabled.

Step 511: The center node searches configuration items of new domain names, to obtain a new domain name whose template domain name ID is an ID of the service domain name, and sets deployment states of the configuration items of the found new domain name to be offline states.

Step 512: The center node instructs the edge nodes to delete the configuration items of the new domain name, or switch the configuration items of the new domain name from an enabled state to a disabled state, thus disabling the HTTPS security acceleration function deployed for the service domain name.

Particularly, if the configuration items of the new domain name are switched from the enabled state to the disabled state, when the HTTPS security acceleration function needs to be deployed for the service domain name again subsequently, the center node may send an enable instruction to the edge nodes, to switch the configuration items of the new domain name from the disabled state to the enabled state, without transmitting the configuration items of the new domain name again, thus saving communication bandwidth between the center node and the edge nodes.

In this embodiment of the present disclosure, when the certificate providing mode is provision-by-CDN, a center node of a CDN determines a service domain name to be processed, and obtains configuration parameters that are input by a user in a configuration interface; generates a new domain name according to a preset domain name generating rule and by using the service domain name as a template domain name, where configuration items of the new domain name are inherited from the service domain name; sets a certificate providing mode in the configuration items of the new domain name to be provision-by-CDN, sets a back-to-source mode of an origin site to be HTTP back-to-source or HTTPS back-to-source, and sets certificate content to be a CDN-provided; and then sends the configured configuration items of the new domain name to nodes in the CDN. The edge nodes separately deploy the configured configuration items, to complete deployment of an HTTPS security acceleration function for the service domain name. A flexible back-to-source mode of the origin site can be implemented, fully meeting diversified requirements during deployment of the HTTPS security acceleration function in the CDN.

In an optional embodiment of the present disclosure, when the HTTPS security acceleration function of the service domain name needs to be disabled, a new domain name generated for the service domain name can be found efficiently by searching for a template domain name ID that is the same as an ID of the service domain name. Then, a deployment state of each configuration item of the new domain name is set to be an offline state in the CDN, and the configuration items of the new domain name configured by the node are deleted, so as to efficiently disable the HTTPS security acceleration function deployed for the service domain name.

In addition, it is expensive and complex for a user to apply for a certificate from the CA. In addition, only few certificates are free of charge, and the certificates are insecure. The method of directly providing a certificate by a CDN platform not only improves efficiency and reduces costs of deploying an HTTPS security acceleration function in the CDN, and ensures security.

This embodiment of the present disclosure not only supports an administrative user of a service domain name to set a certificate providing mode to be provision-by-CDN, but also supports the administrative user of the service domain name to set the certificate providing mode to be provision-by-user, to meet a user's requirement of using a certificate flexibly.

Figures 1, 6:
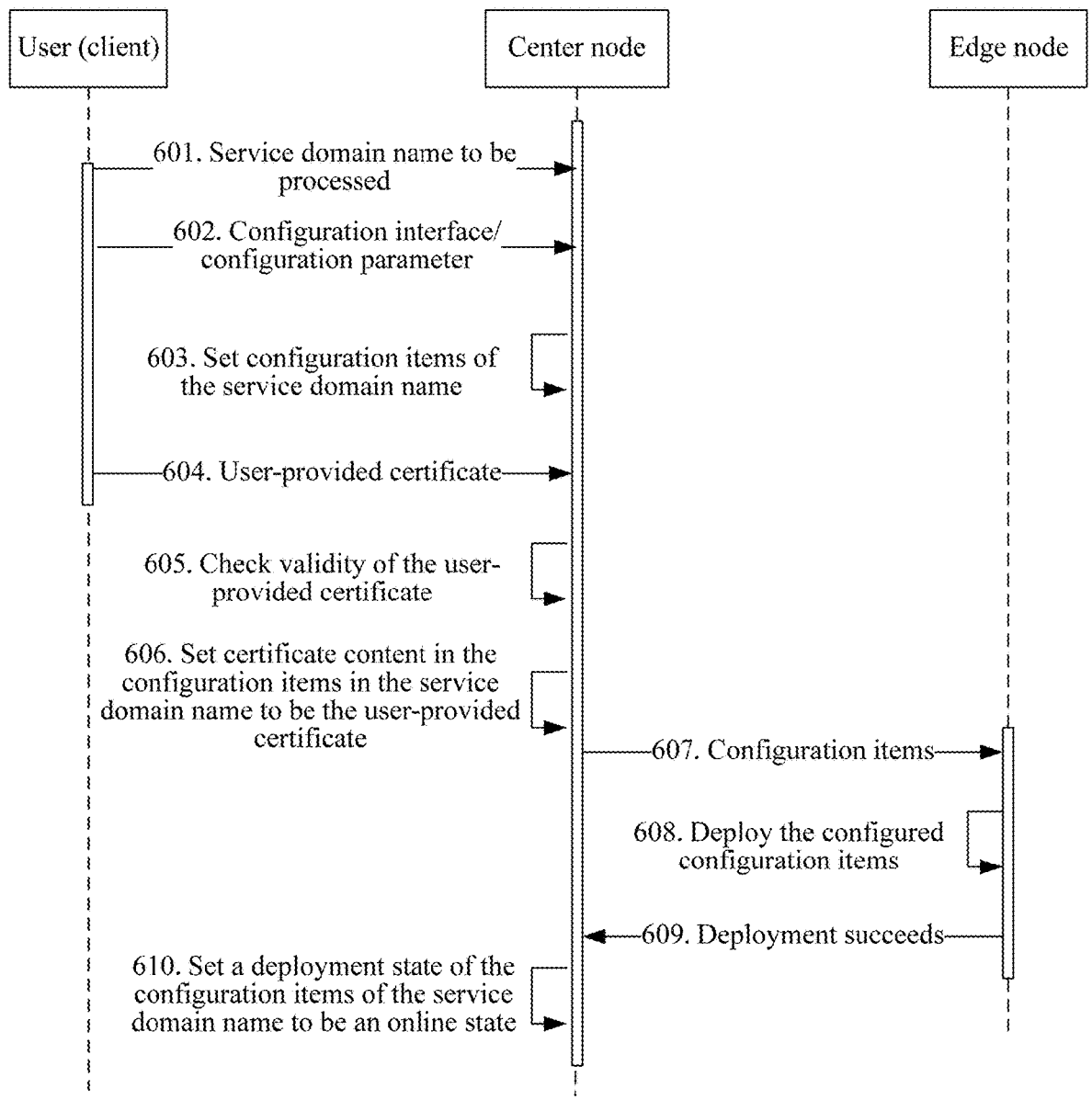
Figures 2, 6:
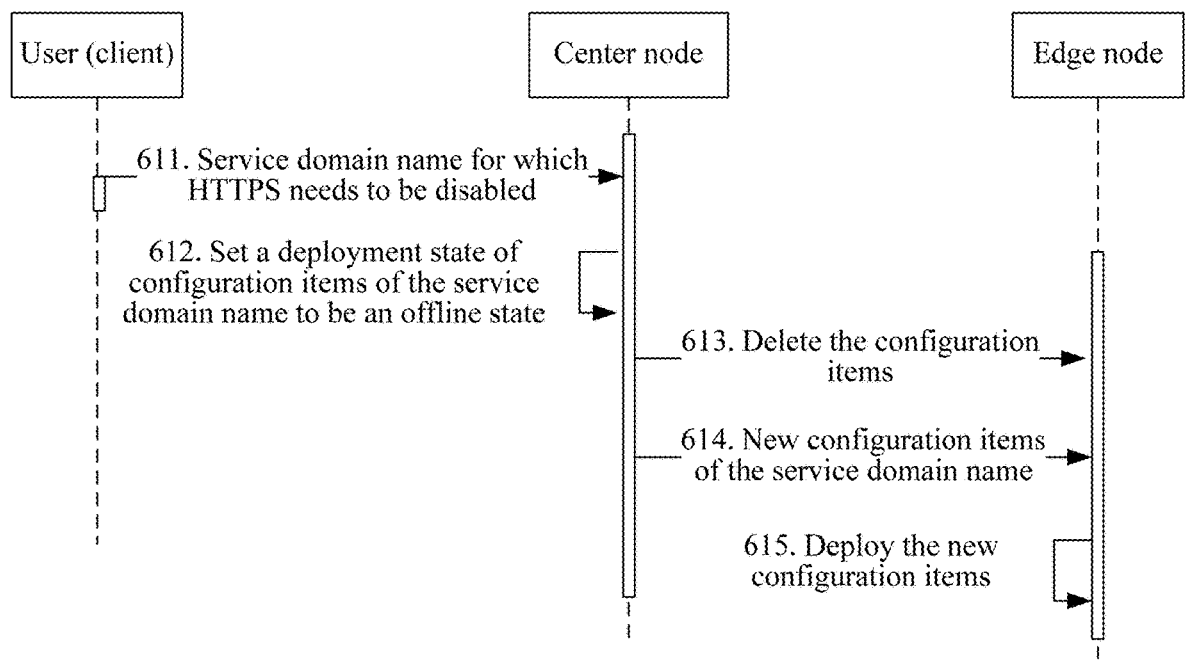

Referring to FIG. 6-1, FIG. 6-1 is a schematic flowchart of a CDN-based information processing method provided on the basis of the CDN architecture shown in FIG. 1-3 according to an embodiment of the present disclosure. The processing method based on a CDN described in this embodiment of the present disclosure includes the following steps:

Step 601: A center node of a CDN receives a user-specified service domain name to be processed, that is, a service domain name for which an HTTPS security acceleration function needs to be deployed.

Step 602: The center node of the CDN obtains, by using a configuration interface, configuration parameters that are input by the user for the service domain name.

Step 603: When a certificate providing mode is provision-by-user, the center node of the CDN sets configuration items of the service domain name in the following manner: setting a certificate providing mode in the configuration items of the service domain name to be provision-by-user, and setting a back-to-source mode of an origin site to be HTTP back-to-source or HTTPS back-to-source according to the setting input by the user.

Step 604: The center node of the CDN obtains a user-provided certificate.

In an example, the user-provided certificate is applied for from a CA and carries a service domain name (that is, the service domain name for which the HTTPS security acceleration function needs to be deployed), a validity period (optional), a public key of an asymmetric encryption algorithm, and a digital signature.

Step 605: The center node checks validity of the user-provided certificate.

For example, the user-provided certificate is applied for by the user from the CA, and includes a domain name to which the certificate applies, a validity period, a public key of an asymmetric encryption algorithm, and a digital signature of the CA. The digital signature may be obtained after the CA encrypts a digest of the domain name to which the certificate applies and the validity period by using a private key of the asymmetric encryption algorithm.

Step 606: When the user-provided certificate is valid, the center node of the CDN sets certificate content in the configuration items of the service domain name to be a user-provided certificate.

For example, a certificate issued by the CA to the user may include a domain name to which the certificate applies, a validity period, a public key of an asymmetric encryption algorithm, and so on. The center node of the CDN checks the validity of the user-provided certificate. The domain name can be verified in the following manner:

The center node calculates a digest of the domain name and the validity period carried in the certificate, and compares the calculated digest with a digest of the domain name and the validity period obtained by decrypting the digital signature by using the public key. If the two digests are inconsistent, it indicates that the certificate fails to pass the validity check. If the two digests are consistent, the domain name to which the user-provided certificate applies is read, to determine whether the domain name to which the user-provided certificate applies matches the service domain name to be processed and whether the user-provided certificate has expired. If the domain name to which the user-provided certificate applies matches the service domain name, and the user-provided certificate has not expired, the center node of the CDN can determine that the user-provided certificate is valid, and can be used for HTTPS communication between the user and the CDN. The certificate content in the configuration items of the service domain name is set to be a user-provided certificate.

Step 607: The center node of the CDN sends the configured configuration items of the service domain name to edge nodes in the CDN.

In the configuration items of the service domain name, the certificate providing mode is provision-by-user, the back-to-source mode of the origin site is HTTP back-to-source or HTTPS back-to-source according to the setting input by the user, and the certificate content is content of the user-provided certificate.

Step 608: The edge nodes separately deploy the configured configuration items.

For example, configuration items required for deploying the HTTPS security acceleration function for the service domain name are the configuration items of the service domain name, and the center node of the CDN issues the configured configuration items of the service domain name to the edge nodes in the CDN.

Step 609: The edge nodes separately deploy the configuration items for the service domain name, and send deployment success notification messages to the center node of the CDN after the deployment succeeds.

Step 610: The center node of the CDN sets a deployment state of each configuration item of the service domain name to be an online state when confirming that the deployment success notification message sent by each edge node is received, thus completing deployment of the HTTPS security acceleration function for the service domain name.

Continuing with FIG. 6-1, processing when the center node determines to disable the HTTPS security acceleration function deployed for the center node is described continuously. Referring to FIG. 6-2, FIG. 6-2 is a schematic flowchart of a CDN-based information processing method provided on the basis of the CDN architecture shown in FIG. 1-3 according to an embodiment of the present disclosure. The information processing method based on an CDN described in this embodiment of the present disclosure includes the following steps:

Step 611: The center node receives a user-specified service domain name whose HTTPS security acceleration function needs to be disabled.

Step 612: The center node searches for an ID of the service domain name, and sets deployment states of the configuration items of the found service domain name to be offline states.

Step 613: The center node of the CDN instructs the edge nodes to clear the following configuration items of the service domain name: the certificate providing mode, the certificate content, and the back-to-source mode of the origin site, thus disabling the HTTPS security acceleration function deployed for the service domain name.

As an alternative solution to deleting the configuration times of the service domain name, the center node instructs the edge nodes to switch the configuration items of the service domain name from an enabled state to a disabled state. In this way, when the HTTPS security acceleration function needs to be deployed for the service domain name again subsequently, the center node may instruct the edge nodes to switch the configuration items of the corresponding service domain name from the disabled state to the enabled state again, without transmitting the configuration items of the service domain name again, thus saving communication bandwidth between the center node and the edge nodes.

In addition, for the service domain name whose HTTPS security acceleration function is already disabled, the edge node can continue to use the configuration items shown in Table 1 that are issued when the center node deploys the CDN function, to implement the CDN function for the service domain name. Definitely, in some feasible implementations, for the service domain name whose HTTPS security acceleration function is already disabled, the center node may continue to issue, to the edge nodes, new configuration items as shown in Table 1, to update the CDN function deployed for the service domain name. The process is described with reference to step 614 and step 615.

Step 614: The center node of the CDN sends new configuration items of the service domain name to the edge nodes in the CDN.

Step 615: The edge node separately deploy the new configuration items of the service domain name.

For example, if the certificate providing mode is provision-by-user, the center node of the CDN clears the certificate providing mode, the certificate content and the back-to-source mode of the origin site in the configuration items of the service domain name, and replace the cleared configuration items of the service domain name with new configuration items of the service domain name, to deploy the new configuration items of the service domain name at the edge nodes of the CDN. After deployment at each edge node succeeds, the HTTPS security acceleration function deployed for the service domain name can be disabled.

In this embodiment of the present disclosure, when the certificate providing mode is provision-by-user, the center node of the CDN determines a service domain name to be processed, and obtains configuration parameters that are input by input by a user through selection in a configuration interface; sets a certificate providing mode in configuration items of the service domain name to be provision-by-user, and sets a back-to-source mode of an origin site to be HTTP back-to-source or HTTPS back-to-source; and completes deployment of an HTTPS security acceleration function for the service domain name. In the configuration parameters, the back-to-source mode of the origin site is either HTTP back-to-source or HTTPS back-to-source, implementing a flexible back-to-source mode of the origin site, and fully meeting diversified requirements during deployment of the HTTPS security acceleration function in the CDN. In addition, the back-to-source mode of the origin site may be HTTPS back-to-source, so that the HTTPS security acceleration function can also be easily deployed for a service domain name of an origin site using the HTTPS origin site, expanding the application range.

A process of implementing the security acceleration function after the edge nodes configure the configuration items for implementing the HTTPS security acceleration function of the service domain name is described with reference to a specific example.

A user manages a site whose domain name is www.qq.com, and wants to deploy an HTTPS security acceleration function for a service domain name static.orangeholic.cn used by the site when providing a page browsing service. In this case, the user accesses a center node of a CDN by using a browser client, and sets, in a configuration interface provided by the center node, the following configuration parameters of the configuration items shown in Table 1 for the service domain name static.orangeholic.cn:

back-to-source domain name: www.qq.com; service domain name: static.orangeholic.cn; cache strategy: a cache period of 300 seconds for JavaScript, and a cache period 86400 seconds for CSS. According to the configuration parameters set by the user, the center node allocates the configuration parameters of the following configuration items to the service domain name: ID of service domain name: 5303; and CDN domain name: cosabc.cdn.dnsv1.com, which is used as another name for the service domain name in the CDN, and is unique.

In addition, in order to deploy the HTTPS security acceleration function for the service domain name, configuration parameters of the configuration items shown in Table 2 are further set for the service domain name static.orangeholic.cn in the configuration interface provided by the center node: certificate providing mode: provision-by-CDN; back-to-source mode: HTTPS back-to-source. The center node adaptively configures the configuration parameters of the following configuration items: template domain name ID: 5303; certificate content: applicable to domain name: static_orangeholic_cn. qcloudcdn.com; validity period, public key, and digital signature. The certificate content is a new domain name generated by the center node by using the service domain name static.orangeholic.cn as a template domain name and according to the preset domain name generating rule.

The center node sends the configuration items shown in Table 1 and Table 2 to the edge nodes in the CDN. After deploying the configuration items, the edge nodes send success messages to the center node, thereby completing deployment of the HTTPS security acceleration function for the service domain name static.orangeholic.cn.

Figures 1, 7:
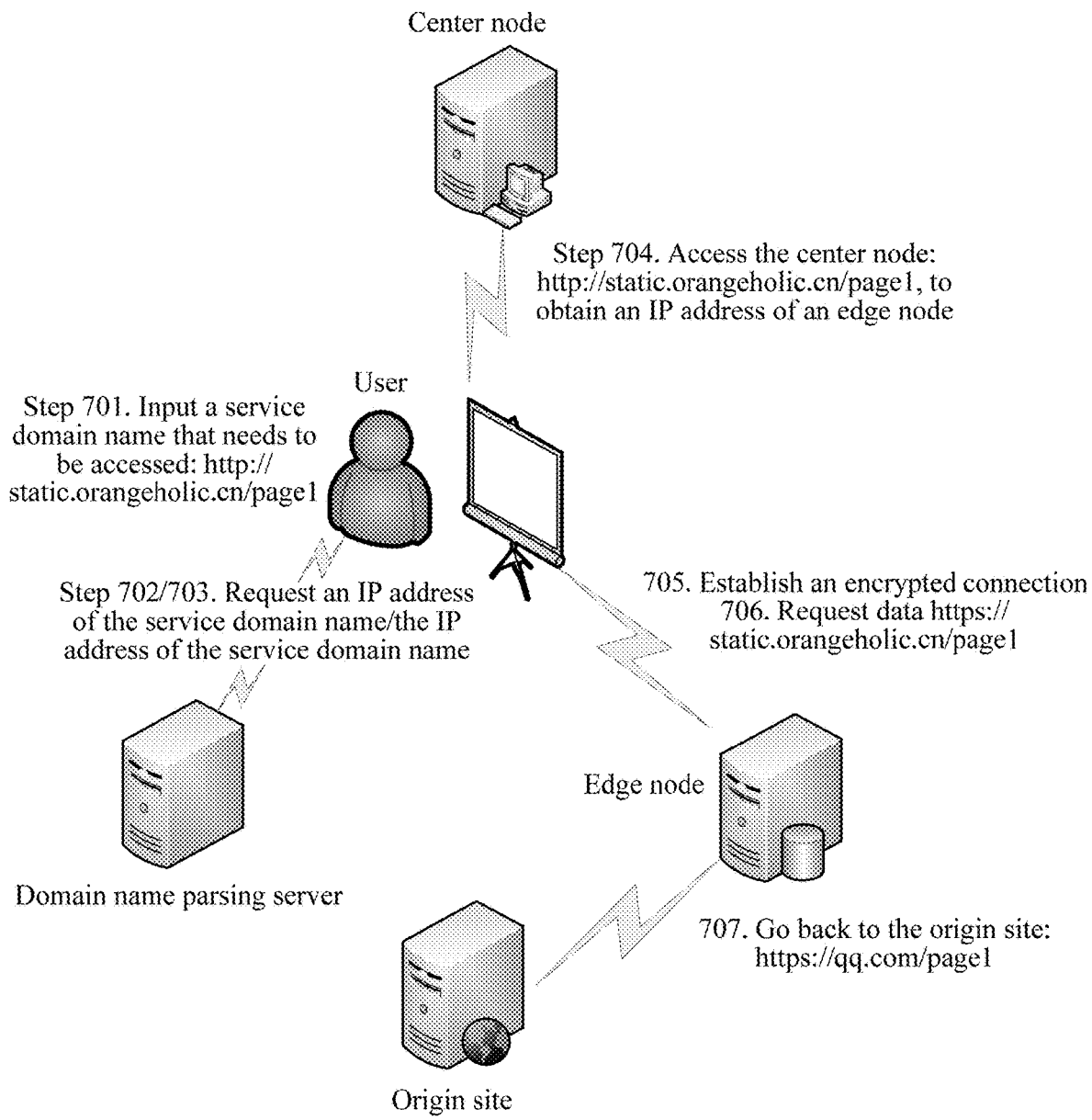
Figures 2, 7:
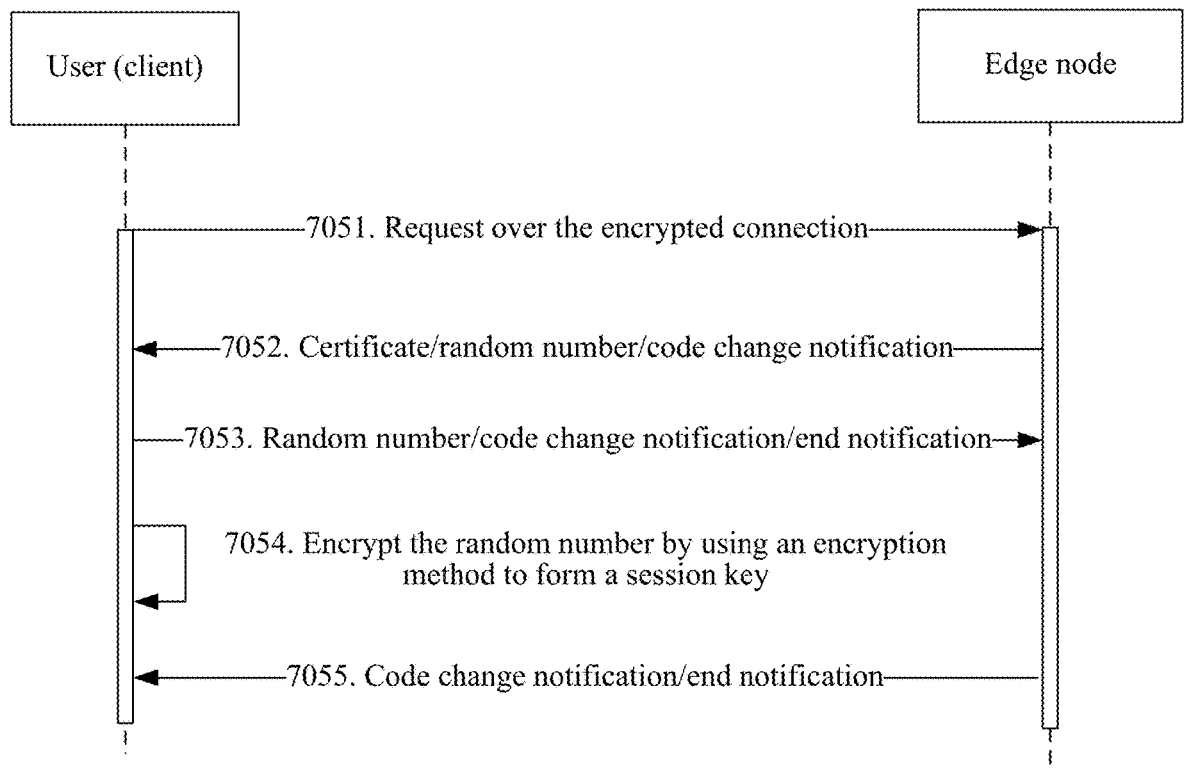

Referring to FIG. 7-1, FIG. 7-1 is a schematic flowchart of a processing method based on a CDN provided on the basis of the CDN architecture shown in FIG. 1-3, and shows a process of an HTTPS security acceleration function.

At step 701, a user may input, in a client such as a browser, a service domain name that needs to be accessed.

For example, if the domain name that needs to be accessed is static.orangeholic.cn, a request is: http://static.orangeholic.cn/page1.

At step 702, the client may request, from a domain name parsing server, an IP address to which the service domain name static.orangeholic.cn is mapped.

Generally, the client first searches for the IP address to which the service domain name static.orangeholic.cn is mapped in a domain name continuous cache of the client. If the IP address is not found, the client searches for the IP address in a host file of a host terminal of the client (the host file is a database for storing a mapping relationship between domain names and IP addresses in the host terminal). If the IP address to which the service domain name static.orangeholic.cn is mapped is still not found, the client requests, from a pre-configured domain name parsing server in the host terminal, the IP address to which the service domain name static.orangeholic.cn is mapped.

At step 703, the domain name parsing server may return, to the client, the IP address to which the service domain name static.orangeholic.cn is mapped.

At step 704, the client may send a domain name accessing request to a center node according to an IP address of the center node, and obtain an IP address of an edge node.

The center node keeps communication with the edge nodes and collects states of the edge nodes, to make sure that the request of the user is not redirected to an unavailable edge node. Moreover, the center node searches for an IP address of an edge node closest to the user while ensuring load balancing of the edge nodes.

For example, if the IP address of the center node is x.x.xx.xx (x represents a decimal number) and the request is: http://x.x.xx.xx/page1, the center node receives the request of the client, determines an IP address of an edge node that is closest to the user and that is used for responding to the request, and returns the IP address of the edge node to the client, implementing redirection of the access request of the client.

At step 705, the client may establish an encrypted connection with the edge node.

The center node finds that the service domain name static.orangeholic.cn is already deployed with the HTTPS security acceleration function. Therefore, after the center node determines the IP address of the most suitable edge node, the HTTP request sent by the client to the edge node will be redirected by the edge node as an HTTPS request. The client needs to establish an encrypted connection with the edge node.

Referring to FIG. 7-2, FIG. 7-2 is a schematic flowchart of a CDN-based information processing method provided on the basis of the CDN architecture shown in FIG. 1-3 according to an embodiment of the present disclosure, and shows a process of establishing, by the client, an encrypted connection with the edge node. The process includes step 7051 to step 7055:

At step 7051, the client may send a request for an encrypted connection to the edge node.

The client mainly provides the following information for the edge node: 1) a supported protocol version, for example TLS version 1.0; 2) a random number generated by the client; 3) a supported encryption method, for example, encryption by using a public key of an asymmetric encryption algorithm; 4) a supported compression method.

At step 7052, the edge node may return a certificate of the service domain name to the client.

After receiving the request from the client, the edge node determines whether the domain name that the client requests to access is consistent with a template domain name of a new domain name carried in an already deployed digital certificate, where the template domain name is a service domain name used for conversion into the new domain name. For example, the service domain name that the client requests to access is static.orangeholic.cn, while a CDN domain name carried in a certificate deployed on the edge node is static_orangeholic_cn. qcloudcdn.com; if it is determined, by querying pre-deployed configuration items, that static_orangeholic_cn. qcloudcdn.com is formed through conversion based on the service domain name static.orangeholic.cn, a response including the digital certificate is sent to the client:

The response may include: 1) a protocol version used for encrypted communication, for example, TLS version 1.0, where the edge node disables the encrypted communication if the client and the edge node support different versions; 2) a random number generated by the edge node, which is encrypted by using a public key to prevent eavesdropping; 3) an encryption selected by the edge node, for example, encryption using a public key of an asymmetric encryption algorithm or encryption using a private key of a symmetric encryption algorithm; 4) a certificate that carries a service domain name to which the certificate applies, a public key, and a digital signature.

At step 7053, the client may verify a digital signature in the certificate returned by the edge node, and after the verification succeeds, the client extracts a public key from the certificate, and sends the following information to the edge node:

1) a random number generated by the client, where the random number is encrypted by using a public key to prevent eavesdropping; 2) a code change notification, representing that all subsequent information will be sent after being encrypted by using a negotiated encryption method and key; and 3) an end notification, representing that the client has finished negotiation of a session key, and where the end notification carries a digest of the foregoing information (the random number and the code change notification), to be verified by the edge node.

Meanwhile, the client further encrypt, by using an encryption method selected from encryption algorithms that are supported by the edge node at the client, the random number generated by the client and the random number generated by the edge node random number, to obtain a session key used for encrypting data transmitted during a session between the client and the edge node.

At step 7054, after receiving the random number of the client, the edge node may encrypt the random number by using a negotiated encryption method, to form a session key.

At step 7055, the edge node may send the following information to the client:

1) a code change notification, representing that all subsequent information will be sent after being encrypted by using a negotiated encryption method and key; and 2) an end notification, representing that the edge node has finished a session key negotiation stage, where the end notification carries a digest of the foregoing information (the code change notification), to be verified by the client.

So far, the key negotiation stage has ended. The client and the server encrypt, by using the encryption method determined through negotiation, the received random number of the other party and the random number generated by itself, to obtain a session key used for the session.

At step 706, the client may request data by using the encrypted connection with the edge node.

The client and the server enter an encrypted communication stage, that is, the client and the server communicate based on the HTTP, and data is encrypted by using the session key.

For example, the client sends an encrypted request to the edge node: https://static.orangeholic.cn/page1. The edge node queries whether page data of requested page1 is stored locally. If yes, the edge node encrypts the data by using the session key and then returns the encrypted data to the client. The client decrypts the data by using a pre-calculated session key and then loads the data. Because a symmetric encryption algorithm is used for encrypted communication, the encryption/decryption efficiency is higher than that of an asymmetric encryption algorithm, and the computing resources are saved.

If the edge node does not locally store the page data of page 1 requested by the client, the edge node goes back to the origin site to request the data. The edge node requests, according to the back-to-source mode specified by the user for the service domain name static.orangeholic.cn, the page data of page1 from the origin site. As described above, the back-to-source mode of the origin site is HTTPS back-to-source, and is described with reference to step 707.

At step 707, the edge node may access to the origin site, obtain the data requested by the user, encrypt the data, and return the encrypted data to the client.

Before requesting the page data of page1 from the origin site, the edge node origin site establishes an encrypted connection with the origin site. For a manner of establishing encrypted communication, reference may be made to the foregoing manner of establishing encrypted communication between the client and the edge node. Details are not described again.

The edge node sends an encrypted request to the origin site: https://qq.com/page1. The origin site searches for encrypted page data of page1. The edge node decrypts the encrypted page data by using a session key (session key negotiated with the origin site), encrypts the page data by using the session key negotiated with the client, and returns the encrypted page data to the client. The client decrypts the encrypted page data by using the session key negotiated with the edge node and then loads the page data.

In conclusion, when a user requests data, the center node selects, according to a global load balancing strategy, an edge node near the user to respond to the request of the user, implementing acceleration of a data requesting service. Communication between the user and the edge node and communication between the edge node and the origin site during back-to-source are encrypted, realizing a security function.

Figure 8:
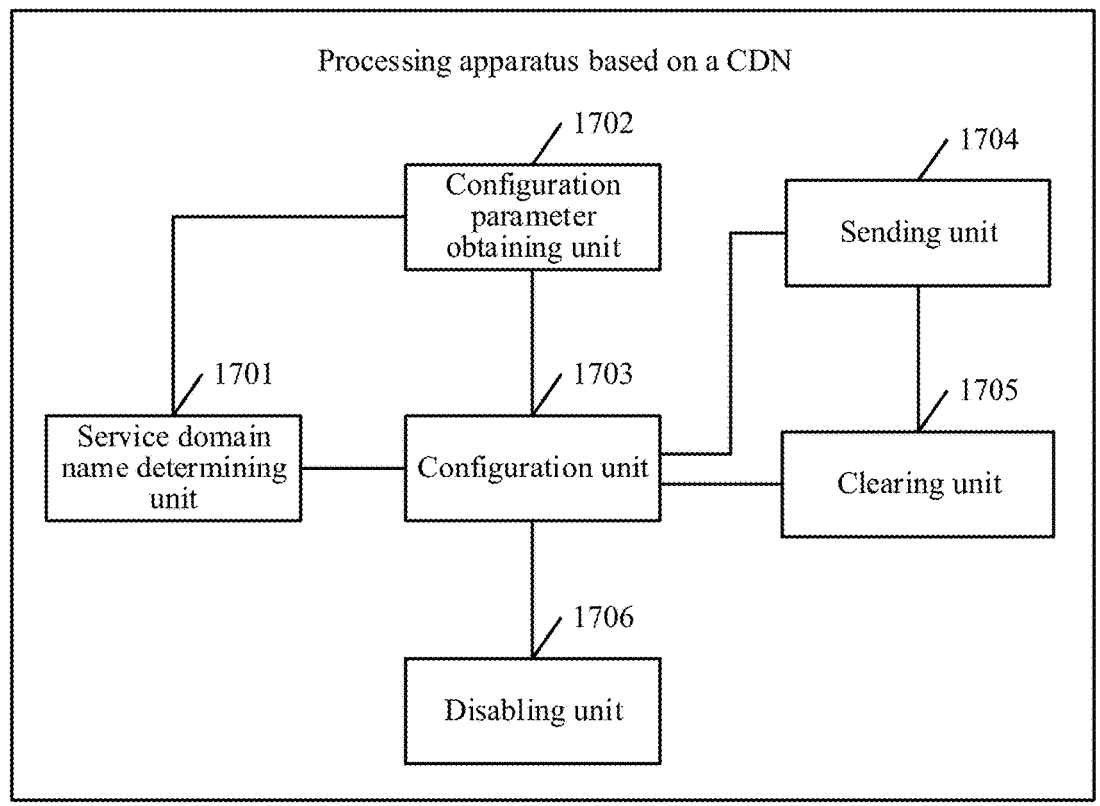
FIG. 8 is a schematic structural diagram of an embodiment of an information processing apparatus based on an example of at least a portion of a CDN according to an embodiment of the present disclosure.

Referring to FIG. 8, FIG. 8 is a schematic structural diagram of a processing apparatus based on a CDN according to an embodiment of the present disclosure. The apparatus can be implemented as a center node deployed in a CDN. The processing apparatus based on a CDN described in this embodiment of the present disclosure includes:

a service domain name determining unit 1701, configured to determine a service domain name to be processed;

a configuration parameter obtaining unit 1702, configured to obtain configuration parameters that are input for the service domain name by using a configuration interface;

a configuration unit 1703, configured to configure configuration items according to the configuration parameters, the configuration items being used for deploying an HTTPS security acceleration function for the service domain name; and a sending unit 1704, configured to send the configured configuration items to edge nodes in the CDN, so that the edge nodes separately deploy the configured configuration items, to complete deployment of the HTTPS security acceleration function for the service domain name.

The configuration parameters include a certificate providing mode and a back-to-source mode of an origin site in the configuration interface. The certificate providing mode is either provision-by-user or provision-by-CDN. The back-to-source mode of the origin site is either HTTP back-to-source or HTTPS back-to-source.

In some feasible implementations, the certificate providing mode is provision-by-CDN, and the configuration unit 1703 is specifically configured to:

generate a new domain name according to a preset domain name generating rule and by using the service domain name as a template, configuration items of the new domain name being inherited from the service domain name; and set a certificate providing mode in the configuration items of the new domain name to be provision-by-CDN, and set a back-to-source mode of an origin site to be HTTP back-to-source or HTTPS back-to-source, and set certificate content to be a CDN-provided certificate.

Configuration items required for deploying the HTTPS security acceleration function for the service domain name are the configuration items of the new domain name.

In some feasible implementations, the configuration unit 1703 is further configured to set a template ID in the configuration items of the new domain name to be domain name ID of the service domain name.

The apparatus further includes:

a disabling unit 1706, configured to offline and delete, from the CDN, configuration items of a new domain name whose template ID is the domain name ID of the service domain name, so as to disable the HTTPS security acceleration function deployed for the service domain name.

In some feasible implementations, the certificate providing mode is provision-by-user, and the configuration unit 1703 is specifically configured to:

set a certificate providing mode in the configuration items of the service domain name to be provision-by-user, and set a back-to-source mode of an origin site to be HTTP back-to-source or HTTPS back-to-source;

obtain a user-provided certificate;

check validity of the user-provided certificate; and set certificate content in the configuration items of the service domain name to be a user-provided certificate if the user-provided certificate is valid.

Configuration items required for deploying the HTTPS security acceleration function for the service domain name are the configuration items of the service domain name.

In some feasible implementations, the apparatus further includes:

a clearing unit 1705, configured to delete the certificate providing mode, the certificate content, and the back-to-source mode of the origin site in the configuration items of the service domain name.

The sending unit 1704 is further configured to instruct the edge nodes to delete the configuration items of the service domain name, or switch the configuration items of the service domain name to a disabled state, so as to disable the HTTPS security acceleration function deployed for the service domain name.

In some feasible implementations, the configuration unit 1703 specifically checks the validity of the user-provided certificate in the following manner:

determining whether the user-provided certificate matches the service domain name, and whether the user-provided certificate expires currently; and if the user-provided certificate matches the service domain name and the user-provided certificate does not expire currently, determining that the user-provided certificate is valid.

Figure 9:
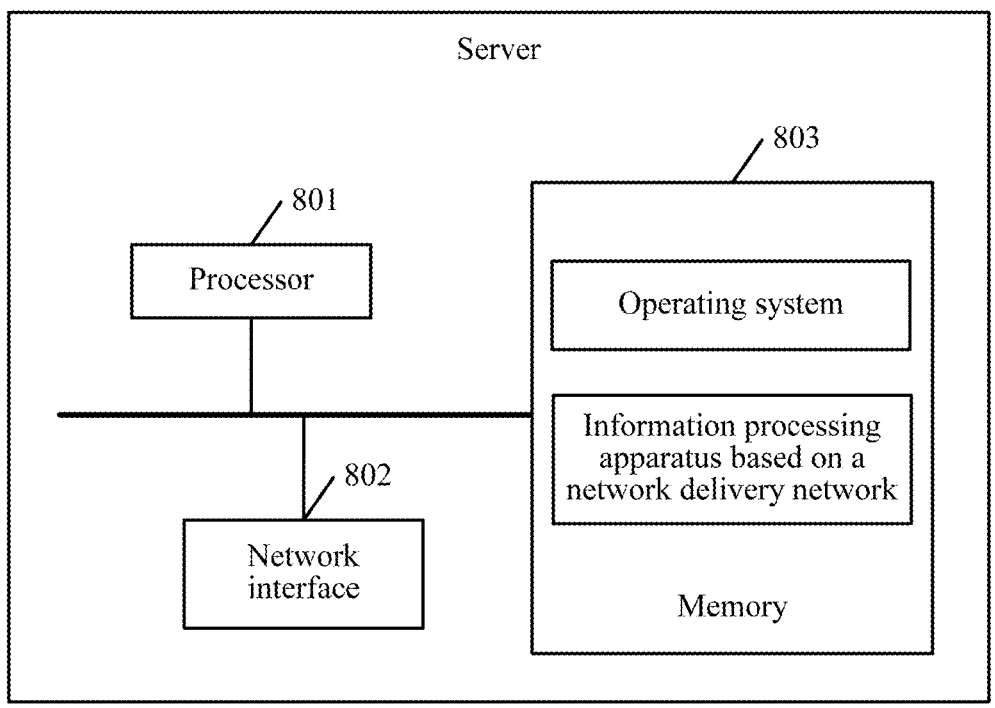
FIG. 9 is a schematic structural diagram of an embodiment of an example of a server according to an embodiment of the present disclosure.

Referring to FIG. 9, FIG. 9 is a schematic structural diagram of a server according to an embodiment of the present disclosure. The server described in this embodiment of the present disclosure can perform functions of the center node of the CDN described above. A front-end server includes: a processor 801, a network interface 802, and a memory 803. The processor 801, the network interface 802 and the memory 803 may be connected by using a bus or in other manners. In FIG. 9 in this embodiment of the present disclosure, connection by using a bus is used as an example. It can be understood that, the bus is configured to implement connection and communication between these components. In addition to a data bus, the bus further includes a power bus, a control bus, and a status signal bus.

The processor 801 is a computing core and a control core of the server. The processing method provided in the foregoing embodiments of the present disclosure may be applied to the processor 801 or implemented by the processor 801. The processor 801 may be an integrated circuit chip and has a signal processing capability. In an implementation process, the steps of the foregoing methods may be completed by using hardware integrated logic circuits or software-form instructions in the processor 801. The processor 801 may be a general-purpose processor, a digital signal processor (DSP), or another programmable logic device, a discrete gate, a transistor logic device, a discrete hardware component, or the like. The processor 801 can implement or perform the information processing methods, steps, and logic block diagrams provided in the embodiments of the present disclosure. The general-purpose processor may be a microprocessor, or any conventional processor or the like. The steps of the methods disclosed with reference to the embodiments of the present disclosure can be directly performed and completed by a hardware decoding processor, or by a combination of hardware in the decoding processor and a software module. The software module may be located in a storage medium. The storage medium is located in the memory 803. The processor 801 reads information in the memory 803, and completes the steps of the methods above by using the hardware thereof.

Alternatively or in addition, examples of the processor 801 may include a general processor, a central processing unit, a microcontroller, a server, an application specific integrated circuit (ASIC), a digital signal processor, a field programmable gate array (FPGA), and/or a digital circuit, analog circuit, or some combination thereof. The processor 801 may be one or more devices operable to execute logic. The logic may include computer executable instructions or computer code stored in the memory 803 or in other memory that when executed by the processor 801, cause the processor 801 to perform the features implemented by the logic the server or methods described herein. The computer code may include instructions executable with the processor 801.

The network interface 802 optionally may include a standard wired interface, a wireless interface such as a Wireless Fidelity (Wi-Fi) interface, a mobile communications interface, or the like.

The memory 803 may be a volatile memory or a non-volatile memory, and may also include both a volatile memory and a non-volatile memory. The non-volatile memory may be a read-only memory (ROM), a programmable read-only memory (PROM), and an erasable programmable read-only memory (EPROM). The memory 803 described in this embodiment of the present disclosure is intended to include, but not limited to, these memories and any other appropriate types of memories.

Alternatively or in addition, the memory 803 may be any device for storing and retrieving data or any combination thereof. The memory 803 may include non-volatile and/or volatile memory, such as a random access memory (RAM), a read-only memory (ROM), an erasable programmable read-only memory (EPROM), or flash memory. Alternatively or in addition, the memory 803 may include an optical, magnetic (hard-drive) or any other form of data storage device. In some examples, the memory may include any of the units 1702-1706, including the service domain name determining unit 1701, the configuration parameter obtaining unit 1702, the configuration unit 1703, the sending unit 1704, the clearing unit 1705 and/or the disabling unit 1706.

It can be understood that, the memory 803 here may also be at least one storage apparatus far away from the foregoing processor 801. The memory 803 in this embodiment of the present disclosure is configured to store various types of data, so as to support operations of the front-end server. Examples of the data include: any computer programs for operations, for example, operating systems that may include a Windows system, a Linux system, and so on, which are not limited in this present disclosure. Storage space of the memory 803 further stores an information processing apparatus based on a CDN.

In this embodiment of the present disclosure, the front-end server runs the information processing apparatus based on a CDN in the memory 803, to perform corresponding steps in the method processes shown in FIG. 2, FIG. 5-1, FIG. 5-2, FIG. 6-1 and FIG. 6-2.

The processor 801 is configured to determine a service domain name to be processed.

The processor 801 is further configured to obtain, by using the network interface 802, configuration parameters that are input for the service domain name by using a configuration interface.

The processor 801 is further configured to configure configuration items according to the configuration parameters, the configuration items being used for deploying an HTTPS security acceleration function for the service domain name.

The processor 801 is further configured to send, by using the network interface 802, the configured configuration items to edge nodes in the CDN, so that the edge nodes separately deploy the configured configuration items, to complete deployment of the HTTPS security acceleration function for the service domain name.

The configuration parameters include a certificate providing mode and a back-to-source mode of an origin site in the configuration interface. The certificate providing mode is either provision-by-user or provision-by-CDN. The back-to-source mode of the origin site is either HTTP back-to-source or HTTPS back-to-source.

In some feasible implementations, the certificate providing mode is provision-by-CDN, and the processor 801 specifically configures the configuration items according to the configuration parameters in the following manner:

generating a new domain name according to a preset domain name generating rule and by using the service domain name as a template, configuration items of the new domain name being inherited from the service domain name; and setting a certificate providing mode in the configuration items of the new domain name to be provision-by-CDN, and setting a back-to-source mode of an origin site to be HTTP back-to-source or HTTPS back-to-source, and setting certificate content to be a CDN-provided certificate.

Configuration items required for deploying the HTTPS security acceleration function for the service domain name are the configuration items of the new domain name.

In some feasible implementations, the processor 801 is further configured to set a template ID in the configuration items of the new domain name to be domain name ID of the service domain name.

The processor 801 is further configured to set, by using the network interface 802, configuration items of a new domain name whose template ID is the domain name ID of the service domain name to a CDN offline state, and delete the configuration items, so as to disable the HTTPS security acceleration function deployed for the service domain name.

In some feasible implementations the certificate providing mode is provision-by-user, and the processor 801 specifically configures the configuration items according to the configuration parameters in the following manner: setting a certificate providing mode in the configuration items of the service domain name to be provision-by-user, and setting a back-to-source mode of an origin site to be HTTP back-to-source or HTTPS back-to-source;

obtaining a user-provided certificate;

checking validity of the user-provided certificate; and setting certificate content in the configuration items of the service domain name to be a user-provided certificate if the user-provided certificate is valid.

Configuration items required for deploying the HTTPS security acceleration function for the service domain name are the configuration items of the service domain name.

In some feasible implementations, the processor 801 is further configured to clear the certificate providing mode, the certificate content, and the back-to-source mode of the origin site in the configuration items of the service domain name.

The processor 801 is further configured to send, by using the network interface 802, the configuration items of the service domain name in which the certificate providing mode, the certificate content, and the back-to-source mode of the origin site have been cleared to the edge nodes, so that the edge nodes delete the configuration items of the service domain name, so as to disable the HTTPS security acceleration function deployed for the service domain name.

In some feasible implementations, the processor 801 specifically checks the validity of the user-provided certificate in the following manner:

determining whether the user-provided certificate matches the service domain name, and whether the user-provided certificate expires currently; and if the user-provided certificate matches the service domain name and the user-provided certificate does not expire currently, determining that the user-provided certificate is valid.

As described herein, the center node and/or the edge node may be implemented in many ways. In some examples, each component or module of the server may include a circuit or circuitry. Each circuit or circuitry may be hardware or a combination of hardware and software. The circuitry may include the units 1701 to 1706 and/or other components and subcomponents of the edge node and/or center node described herein. Accordingly, the term module may be used interchangeably with the term module circuitry or circuitry. In some examples, each circuit or circuitry may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each circuitry may include memory hardware, such as a portion of the memory 803, for example, that comprises instructions executable with the processor 801 or other processor to implement one or more of the features of the circuitry. When any one of the circuitry includes the portion of the memory that comprises instructions executable with the processor 801, the circuitry may or may not include the processor 801. In some examples, each circuitry may just be the portion of the memory 803 or other physical memory that comprises instructions executable with the processor 801 or other processor to implement the features of the corresponding circuitry without the circuitry including any other hardware. Because each circuitry includes at least some hardware even when the included hardware comprises software, each circuitry may be interchangeably referred to as a hardware circuitry.

Some features are shown stored in a computer readable storage medium (for example, as logic implemented as computer executable instructions or as data structures in memory). All or part of the server and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such a volatile memory, a non-volatile memory, ROM, RAM, or any other suitable storage device.

The information processing method and apparatus based on a CDN provided in the embodiments of the present disclosure are described above in detail. Although the principles and implementations of the present disclosure are described by using specific examples in the specification, the foregoing descriptions of the embodiments are only intended to help understand the method and the core idea of the method of the present disclosure. A person of ordinary skill in the art may make modifications to the specific implementations and application range according to the idea of the present disclosure. In conclusion, the content of the specification should not be construed as a limitation to the present disclosure.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

The subject-matter of the disclosure may also relate, among others, to the following aspects:

A first aspect of the embodiments of the present disclosure may provide a processing method based on a CDN, including: determining a service domain name to be processed; obtaining configuration parameters that are set for configuration items of the service domain name; setting the corresponding configuration items according to the obtained configuration parameters, the configuration items being used for deploying an HTTPS security acceleration function for the service domain name; and sending, to edge nodes in the CDN, the configuration items for which the corresponding configuration parameters are set, where the configuration items are used by the edge nodes to deploy the HTTPS security acceleration function for the service domain name; the configuration items include a digital certificate providing manner and a back-to-source manner of an origin site; a configuration parameter corresponding to the digital certificate providing manner is either provision-by-user or provision-by-CDN; and a configuration parameter corresponding to the back-to-source manner of the origin site is either HTTP back-to-source or HTTPS back-to-source.

A second aspect of the embodiments of the present disclosure may provide a processing apparatus based on a CDN, including: a service domain name determining unit, configured to determine a service domain name to be processed; a configuration parameter obtaining unit, configured to obtain configuration parameters that are set for configuration items of the service domain name; a configuration unit, configured to set the corresponding configuration items according to the obtained configuration parameters, the configuration items being used for deploying an HTTPS security acceleration function for the service domain name; and a sending unit, configured to send, to edge nodes in the CDN, the configuration items for which the corresponding configuration parameters are set, where the configuration items are used by the edge nodes for deploying an HTTPS security acceleration function for the service domain name; the configuration parameters include a digital certificate providing manner and a back-to-source manner of an origin site; the digital certificate providing manner is either provision-by-user or provision-by-CDN; and the back-to-source manner of the origin site is either HTTP back-to-source or HTTPS back-to-source.

A third aspect of the embodiments of the present disclosure may provide a processing apparatus of a CDN, including: a memory, configured to store an executable program; and a processor, configured to implement the processing method of a CDN according to an embodiment of the present disclosure when executing the executable program stored in the memory.

A fourth aspect of the embodiments of the present disclosure may provide a storage medium, storing an executable program, where the processing method of a CDN according to an embodiment of the present disclosure is implemented when the executable program is executed by a processor.

A fifth aspect of the embodiments of the present disclosure may provide a CDN, including: a center node, configured to convert a service domain name to form a new domain name, generate a digital certificate carrying the new domain name, and send the digital certificate to edge nodes of the CDN, where the center node is further configured to receive a request of a client for accessing the service domain name, and redirect the request to an edge node that meets a load balancing condition in the CDN; and the edge node, configured to: when meeting the load balancing condition, establish an encrypted connection with the client according to the digital certificate sent by the center node; and obtain data requested by the client, and send the data to the client through the encrypted connection.

A sixth aspect of the embodiments of the present disclosure may provide a processing method of a CDN, including: converting, by a center node, a service domain name to form a new domain name, generating a digital certificate carrying the new domain name, and sending the digital certificate to edge nodes of the CDN; when receiving a request of a client for accessing the service domain name, redirecting, by the center node, the request to an edge node that meets a load balancing condition in the CDN; and when meeting the load balancing condition, establishing, by the edge node, an encrypted connection with the client according to the digital certificate sent by the center node; and obtaining data requested by the client, and sending the data to the client through the encrypted connection.

According to the embodiments of the present disclosure, configuration parameters for a service domain name are obtained; configuration items for deploying an HTTPS security acceleration function for the service domain name are configured according to the configuration parameters; the configured configuration items are sent to edge nodes in the CDN; and the edge nodes separately deploy the configured configuration items, so as to complete deployment of the HTTPS security acceleration function for the service domain name.

A certificate is either provided by a user or provided by the CDN. A digital certificate uploaded by a user can be used; in addition, the CDN can also provide a digital certificate for the user, overcoming the defect in the related technology that a user has to apply for and provide a digital certificate and then upload the digital certificate to the CDN.

A back-to-source manner of an origin site is either HTTP back-to-source or HTTPS back-to-source. A flexible certificate providing manner and a flexible back-to-source manner of an origin site can be realized, fully meeting diversified security requirements when the CDN performs a back-to-source operation to the origin site during deployment of the HTTPS security acceleration function in the CDN.

What is claimed is:

1. A content delivery system, comprising:
a plurality of edge nodes; and
a center node comprising hardware circuitry configured to convert a service domain name into a new domain name, generate a digital certificate having the new domain name, and send the digital certificate to the edge nodes, the center node is further configured to receive a request communicated by a client for accessing the service domain name and redirect the request to an edge node that meets a load balancing condition in a content delivery network (CDN), wherein
the edge node comprises hardware circuitry configured to, in response to a detection of a load balancing condition, establish an encrypted connection with a client according to the digital certificate sent by the center node, obtain data requested by the client, and send the data to the client through the encrypted connection.

2. The content delivery system according to claim 1, wherein the hardware circuitry of the center node is further configured to:
substitute a character in the service domain name;
combine the service domain name with a second domain name to form the new domain name;
generate a digital certificate having the new domain name and a public key of an asymmetric encryption algorithm;

calculate a digest of the new domain name using a private key of the asymmetric encryption algorithm; and
generate, based on the digest, a digital signature of the digital certificate.

3. The content delivery system according to claim 1, wherein
the hardware circuitry of the center node is further configured to, in response to receipt of the request communicated by the client and in response the edge nodes being balanced, select an edge node having a least communication delay with the client.

4. The content delivery system according to claim 1, wherein
the hardware circuitry of the edge node is further configured to:
send the digital certificate to the client;
perform, in response to the client successfully verifying a digital signature of the digital certificate, a negotiation operation with the client; and
determine, based on the negotiation operation with the client, a session key between the client and the edge node.

5. The content delivery system according to claim 4, wherein
to determine the session key, the hardware circuitry of the edge node is further configured to select an encryption algorithm from encryption algorithms supported by the client, and encrypt, based on the encryption algorithm selected from encryption algorithms supported by the client, a random number generated by the edge node and a random number generated by the client, wherein
the client is further configured to encrypt, using the encryption algorithm selected by the edge node, the random number generated by the edge node and the random number generated by the client, and determine the session key.

6. The content delivery system according to claim 4, wherein the hardware circuitry of the edge node is further configured to:
determine whether the service domain name that the client requests to access is associated with a template domain name of the new domain name specified by the digital certificate, the template domain name being the service domain name that is converted to form the new domain name;
send, in response to determination that the service domain name that the client requests to access is associated with the template domain name of the new domain name, the digital certificate to the client; and
ignore the request of the client in response to determination that the service domain name that the client requests to access is not associated with the template domain name of the new domain name.

7. The content delivery system according to claim 1, wherein the hardware circuitry of the edge node is further configured to:
in response to receipt of the request of the client through the encrypted connection, search for data requested by the client in the edge node locally without accessing the CDN; and
transmit the data requested by the client to the client via the encrypted connection.

8. The content delivery system according to claim 7, wherein the hardware circuitry of the edge node is further configured to:
establish, in response to the data requested by the client not being found in the edge node locally and a preset back-to-source mode corresponding to the service domain name is Hypertext Transfer Protocol Secure (HTTPS) back-to-source, an encrypted connection with an origin site of the service domain name based on the digital certificate;
obtain, from the origin site, using the encrypted connection with the origin site, data requested by the client; and
transmit the data through the encrypted connection with the client.

9. The content delivery system according to claim 7, wherein the hardware circuitry of the edge node is further configured to: in response to the data requested by the client not being found in the edge node locally and a preset back-to-source mode of the service domain name being Hypertext Transfer Protocol (HTTP) back-to-source, obtain, based on an HTTP connection with the origin site, the data requested by the client; and
transmit the data through the encrypted connection with the client.

10. The content delivery system according to claim 7, wherein the hardware circuitry of the edge node is further configured to:
cache the data requested by the client; and
in response to expiration of a cache period specified in a cache strategy for a corresponding data type, delete cached data having the corresponding data type.

11. The content delivery system according to claim 1, wherein the hardware circuitry of the center node is further configured to:
in response to the service domain name being associated with a CDN-provided digital certificate, convert the service domain name to form the new domain name; and
send the digital certificate to the edge node.

12. The content delivery system according to claim 1, wherein the hardware circuitry of the center node is further configured to:
in response to the service domain name being associated with a parameter to stop using a digital certificate provided by the CDN for the service domain name, instruct the edge node to delete a digital certificate of the new domain name corresponding to the service domain name.

13. A method, comprising:
converting, by a center node of a content delivery network (CDN), a service domain name into a new domain name;
generating, by the center node, a digital certificate having the new domain name;
sending, by the center node, the digital certificate to edge nodes of the CDN;
redirecting, by the center node, in response to receipt of a request of a client for accessing the service domain name, the request to an edge node that meets a load balancing condition in the CDN;
establishing, by the edge node, based on the load balancing condition, an encrypted connection with the client according to the digital certificate sent by the center node;
obtaining, by the edge node, data requested by the client, and sending, by the edge node, the data to the client via the encrypted connection.

14. The method according to claim 13, wherein converting, by the center node of the CDN, the service domain name into the new domain name further comprises:

substituting, by the center node, a character in the service domain name;

combining, by the center node, the service domain name with a second domain name to form the new domain name;

generating, by the center node, a digital certificate carrying the new domain name and a public key of an asymmetric encryption algorithm;

calculating a digest of the new domain name by using a private key of the asymmetric encryption algorithm; and generating a digital signature for the digital certificate.

* * * * *